(12) United States Patent
Shmilovich et al.

(10) Patent No.: US 7,726,609 B2
(45) Date of Patent: Jun. 1, 2010

(54) HIGH-PERFORMANCE LOW-NOISE AIRCRAFT EXHAUST SYSTEMS AND METHODS

(75) Inventors: Arvin Shmilovich, Huntington Beach, CA (US); Yoram Yadlin, Irvine, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 643 days.

(21) Appl. No.: 11/687,595

(22) Filed: Mar. 16, 2007

(65) Prior Publication Data

US 2008/0223992 A1  Sep. 18, 2008

(51) Int. Cl.
*B64C 21/04* (2006.01)
(52) U.S. Cl. .................... 244/207; 244/204; 244/212
(58) Field of Classification Search ................ 244/207, 244/204, 212, 201, 198, 208
See application file for complete search history.

(56) References Cited

U.S. PATENT DOCUMENTS

| 2,164,545 | A | * | 7/1939 | Rogers .................. 244/57 |
| 2,756,008 | A |   | 7/1956 | Davidson |
| 2,928,627 | A |   | 3/1960 | Johnson |
| 2,991,961 | A |   | 7/1961 | Rogallo |
| 3,347,495 | A | * | 10/1967 | Eberhardt et al. ........... 244/207 |
| 3,774,864 | A | * | 11/1973 | Hurkamp .................... 244/13 |
| 3,920,203 | A | * | 11/1975 | Moorehead ................. 244/207 |
| 3,976,160 | A |   | 8/1976 | Hoch et al. |
| 4,026,500 | A |   | 5/1977 | Grow |
| 4,441,313 | A |   | 4/1984 | Joubert et al. |
| 4,463,920 | A | * | 8/1984 | Nichols et al. ............. 244/207 |
| 4,505,443 | A | * | 3/1985 | Bradfield et al. .......... 244/12.5 |
| 4,519,562 | A | * | 5/1985 | Willis ........................ 244/207 |
| 4,878,617 | A |   | 11/1989 | Novotny |
| 4,978,071 | A |   | 12/1990 | MacLean et al. |
| 5,016,818 | A |   | 5/1991 | Nash et al. |
| 5,167,383 | A | * | 12/1992 | Nozaki ..................... 244/12.5 |

(Continued)

FOREIGN PATENT DOCUMENTS

GB          735065        8/1955

(Continued)

OTHER PUBLICATIONS

Taylor, "World Aircraft & Systems Directory", Brassey, Combat Aircraft/USA, 1996, pp. 136-138.

(Continued)

*Primary Examiner*—Christopher P Ellis
(74) *Attorney, Agent, or Firm*—Lee & Hayes, PLLC

(57) ABSTRACT

Aircraft exhaust systems and methods are disclosed. In one embodiment, an integrated propulsion assembly includes a wing assembly having an upper surface and a lower surface, and a propulsion unit at least partially disposed within the wing assembly. An exhaust system is configured to conduct an exhaust flow emanating from the propulsion unit to an exhaust aperture. The exhaust aperture is positioned proximate a trailing edge of the wing assembly, and has an aspect ratio of at least five. In further embodiments, the wing assembly includes a flap member moveably coupled along a trailing edge portion of the wing assembly, and the exhaust aperture is configured to direct the exhaust flow over at least a portion of the flap member.

20 Claims, 17 Drawing Sheets

U.S. PATENT DOCUMENTS

| | | | |
|---|---|---|---|
| 5,437,412 A | 8/1995 | Carletti | |
| 5,593,112 A * | 1/1997 | Maier et al. | 244/117 A |
| 6,962,044 B1 | 11/2005 | Miller et al. | |
| 7,055,307 B2 | 6/2006 | Wehner | |
| 7,096,662 B2 | 8/2006 | Wehner | |
| 7,104,498 B2 * | 9/2006 | Englar et al. | 244/12.6 |
| 2009/0014592 A1 * | 1/2009 | Zha | 244/199.4 |

FOREIGN PATENT DOCUMENTS

| | | | |
|---|---|---|---|
| GB | 790298 | | 2/1958 |
| GB | 2109755 A | * | 6/1983 |
| GB | 2167831 A | * | 6/1986 |
| JP | 03292300 A | * | 12/1991 |

OTHER PUBLICATIONS

UK Combined Search and Examination Report for UK Application No. GB0804222.8, mailed on Jun. 26, 2008, 3 pgs.

* cited by examiner

BASELINE EXHAUST
h×w

ELONGATED EXHAUST
h/2×2w

| | ENGINE DIAMETER D (in) | TOTAL # OF ENGINES | # OF ENGINES PER WING n | NOZZLE HEIGHT h (in) | NOZZLE WIDTH w (in) | NOZZLE AREA (in²) | NOZZLE AR | h/D | w/D | w/nD |
|---|---|---|---|---|---|---|---|---|---|---|
| PRIOR ART | 47 | 4 | 2 | | 94 | | 3.6 | | 2 | 1 |
| EMBODIMENT 0 | 47 | 4 | 2 | 26 | 122 | 2444 | 6 | 0.55 | 2.6 | 1.3 |
| EMBODIMENT 00 | 47 | 4 | 2 | 20 | 244 | 2444 | 24 | 0.43 | 5.2 | 2.6 |
| EMBODIMENT 1 | 47 | 4 | 2 | 10 | 188 | 2444 | 14 | 0.21 | 4.0 | 2.0 |
| EMBODIMENT 2 | 47 | 4 | 2 | 13 | 282 | 2444 | 33 | 0.28 | 6.0 | 3.0 |
| EMBODIMENT 3 | 33 | 8 | 4 | 8.7 | 282 | 2444 | 33 | 0.18 | 8.5 | 2.1 |
| EMBODIMENT 4 | 23.5 | 16 | 8 | 8.7 | 282 | 2444 | 33 | 0.37 | 12.0 | 1.5 |
| EMBODIMENT 5 | 23.5 | 16 | 8 | 5.8 | 423 | 2444 | 73 | 0.25 | 18.0 | 2.3 | ated runway length. For a given runway length, higher lift levels permit larger aircraft weights. Equivalently, for a given aircraft weight, higher lift allows for a lower stall speed and a shorter runway. From an operational perspective, higher lift translates into access to a larger number of airports. Whether the requirement is for a higher aircraft weight or for shorter runways, superior high-lift capability is a key design objective of the aircraft manufacturers.

HIGH-PERFORMANCE LOW-NOISE AIRCRAFT EXHAUST SYSTEMS AND METHODS

FIELD OF THE INVENTION

The field of the present disclosure relates to aircraft exhaust systems, and more specifically, to aircraft exhaust systems and methods that provide improved performance and reduced noise.

BACKGROUND OF THE INVENTION

For some types of aircraft, including transport aircraft, high-lift capability is important, particularly for takeoff and landing requirements. Aircraft designs are typically limited to a maximum takeoff weight and an associated runway length. For a given runway length, higher lift levels permit larger aircraft weights. Equivalently, for a given aircraft weight, higher lift allows for a lower stall speed and a shorter runway. From an operational perspective, higher lift translates into access to a larger number of airports. Whether the requirement is for a higher aircraft weight or for shorter runways, superior high-lift capability is a key design objective of the aircraft manufacturers.

It is known that some types of aircraft employ wing-mounted turbofan (or turbojet) engines configured to impinge the exhaust flow from the wing-mounted engines upon portions of the wing surfaces in order to augment wing lift during low-speed operations. These high-lift (or lift-augmentation) systems may favorably impact short-field take-off and landing capabilities, and may substantially improve the economical and operational characteristics of both military and commercial aircraft. More specifically, from an operational perspective, shorter runways translate into access to a larger number of airports. In the context of military airplanes, an area of high priority is the ability to operate off remote and austere fields. Military transports with short runway capability are important for maximizing the global reach of the airlift force. With respect to commercial transports, the economical impact of high-lift systems can be substantial. For example, an increase in takeoff lift-to-drag ratio (L/D) results in an increase in payload or an increased range.

Although desirable results have been achieved using high-lift aircraft exhaust systems in accordance with the prior art, novel systems and methods that provide improved performance and reduced noise would have greater utility.

SUMMARY

Aircraft exhaust systems and methods in accordance with the invention may advantageously provide improved lift performance and reduced noise in comparison with comparable prior art systems. Improved high-lift capability may allow the use of larger payloads, smaller engines, and shorter runways. Other advantages may include reduced emissions and reduced airplane infrared observability.

In one embodiment, an integrated propulsion assembly includes a wing assembly extending in a span-wise direction and having an upper surface and a lower surface, and at least one propulsion unit at least partially disposed between the upper and lower surfaces. The assembly further includes an exhaust system configured to conduct an exhaust flow emanating from the propulsion unit to an exhaust aperture. The exhaust aperture is positioned proximate a flap of the wing assembly. The exhaust aperture has an aspect ratio defined as a maximum width over a maximum height, the aspect ratio being at least five.

In another embodiment, an aircraft includes a fuselage, at least one wing assembly extending outwardly from the fuselage in a span-wise direction, the wing assembly having an upper surface and a lower surface, and at least one propulsion unit at least partially disposed between the upper and lower surfaces. An exhaust system is configured to conduct an exhaust flow emanating from the propulsion unit to an exhaust aperture proximate a flap of the wing assembly, the exhaust aperture having an aspect ratio defined as a maximum width over a maximum height, the aspect ratio being at least five.

In another embodiment, a method of propelling an aircraft includes providing a wing assembly extending in a span-wise direction and having an upper surface and a lower surface; providing at least one propulsion unit at least partially disposed between the upper and lower surfaces; providing an exhaust system coupled between the propulsion unit to an exhaust aperture proximate a flap of the wing assembly, the exhaust aperture having an aspect ratio defined as a maximum width over a maximum height, the aspect ratio being at least five; operating the propulsion unit to provide an exhaust flow; and conducting the exhaust flow emanating from the propulsion unit through the exhaust system to the exhaust aperture.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure introduces aircraft exhaust systems and methods that provide improved performance and reduced noise in comparison with the prior art. Many specific details of certain embodiments of the invention are set forth in the following description and in FIGS. 1-24 to provide a thorough understanding of such embodiments. One skilled in the art, however, will understand that the invention may have additional embodiments, or that the invention may be practiced without several of the details described in the following description.

In general, embodiments of aircraft exhaust systems and methods introduced by the present disclosure use novel integrated propulsion/airframe configurations for controlling the flow interaction, particularly during takeoff and landing. Substantial aerodynamic improvement may be realized using elongated engine exhaust cross-sections in conjunction with wing hinge flap systems. Propulsion system noise reduction may also be achieved due to the enhanced mixing of engine exhaust with the outer flow over the integrated propulsion/airframe configuration.

Figure 1:
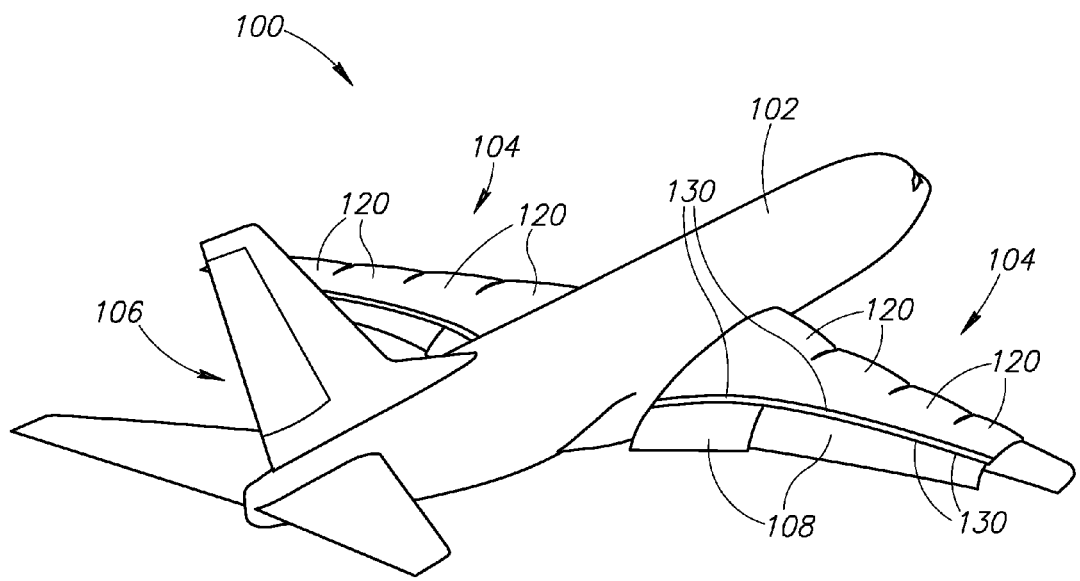
FIG. 1 is a rear isometric view of an aircraft having an exhaust system in accordance with an embodiment of the invention.
Figure 2:
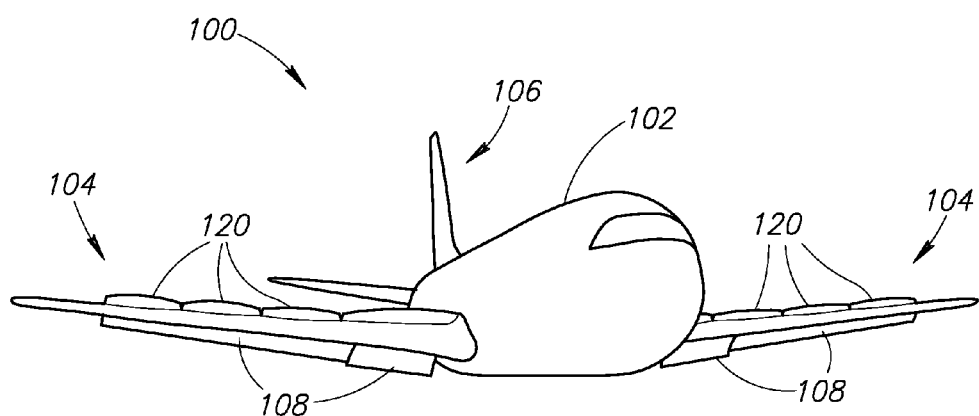
FIG. 2 is a front isometric view of the aircraft of FIG. 1.
Figure 3:
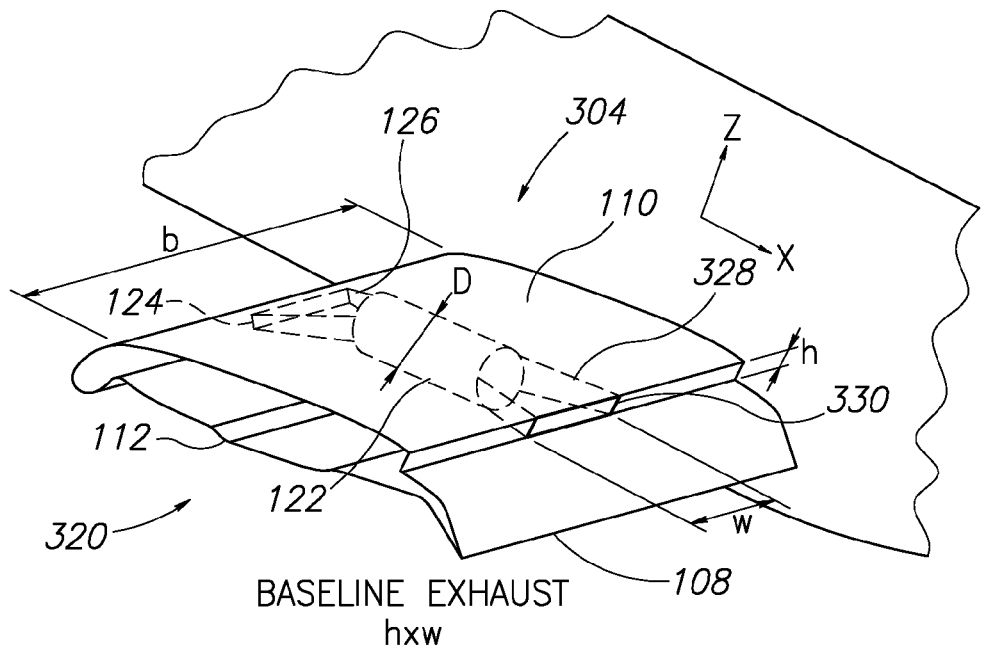
FIG. 3 is an isometric partial view of the inboard segment of a wing assembly having a baseline engine installation including an elongated exhaust aperture in accordance with an embodiment of the invention.

For example, FIG. 1 is a rear isometric view of an aircraft 100 in accordance with an embodiment of the invention. FIG. 2 is a front isometric view of the aircraft 100 of FIG. 1. In this embodiment, the aircraft 100 includes a fuselage 102, a pair of wing assemblies 104 projecting outwardly from the fuselage 102, and a tail assembly 106 positioned at an aft end portion of the fuselage 102. A plurality of flaps 108 are moveably coupled along an aft portion of each wing assembly 104. Each wing assembly 104 includes an upper surface 110 and a lower surface 112 (FIG. 3). In addition, a plurality of engine installations 120 are integrated within and distributed along each of the wing assemblies 104. Although the aircraft 100 shown in FIGS. 1 and 2 includes a plurality of engine installations 120 integrated within each wing assembly 104, in alternate aircraft embodiments, there may be only a single engine installation 120 in each wing assembly 104. Specific details of the engine installation 120 will be described below with reference to FIGS. 3 and 4.

FIG. 3 is an isometric partial view of the inboard segment of a wing assembly 304 having a baseline engine installation 320 in accordance with an embodiment of the invention. In this figure, the components that are hidden from view by the upper surface 110 of the wing assembly 304 are shown in dotted lines. The baseline engine installation 320 includes an engine 122 disposed between the upper and lower surfaces 110, 112 of the wing assembly 304. An inlet 124 is positioned to receive air from the surrounding atmosphere, and a diffuser 126 conducts incoming airflow from the inlet 124 to the engine 122. Similarly, an exhaust duct (or nozzle) 328 conducts exhaust flow from the engine 122 to an exhaust aperture 330 positioned proximate the trailing edge, and in some embodiments, proximate one or more of the flaps 108, of the wing assembly 304. The cross-sectional shape of the exhaust duct 328 typically varies along its length to accelerate the engine exhaust and provide thrust. For the exhaust duct 328 may transition from an approximately circular shape at a first end proximate the engine 122 to an approximately rectangular shape at a second end proximate the exhaust aperture 330. The design and operational characteristics of the inlet 124, the diffuser 126, and the engine 122 are generally known in the art and, for the sake of brevity, will not be described in detail herein.

It will be appreciated that the shape of the exhaust aperture 330 may vary (or may remain constant) depending upon the various operating conditions of the engine 122 throughout the operating regime of the aircraft 100. As shown in FIG. 3, however, at a particular design operating condition of the engine 122 (e.g. maximum power setting, takeoff power setting, etc.), the exhaust aperture 330 has a height h and a width w. More specifically, the exhaust aperture 330 at the design operating condition may provide an exit area (h×w) that is closely comparable to the exit area of prior art exhaust apertures, however, an aspect ratio AR (defined as width over height w/h) of the inventive exhaust aperture 330 is significantly larger than the aspect ratio of prior art exhaust apertures, as described more fully below with respect to FIG. 17. For example, the maximum value of the aspect ratio AR of the exhaust aperture in the prior art is 3.6, while the exhaust aperture 330 of the baseline engine installation 320 has an aspect ratio AR of approximately 6 (see embodiment 0 of FIG. 17).

Figure 4:
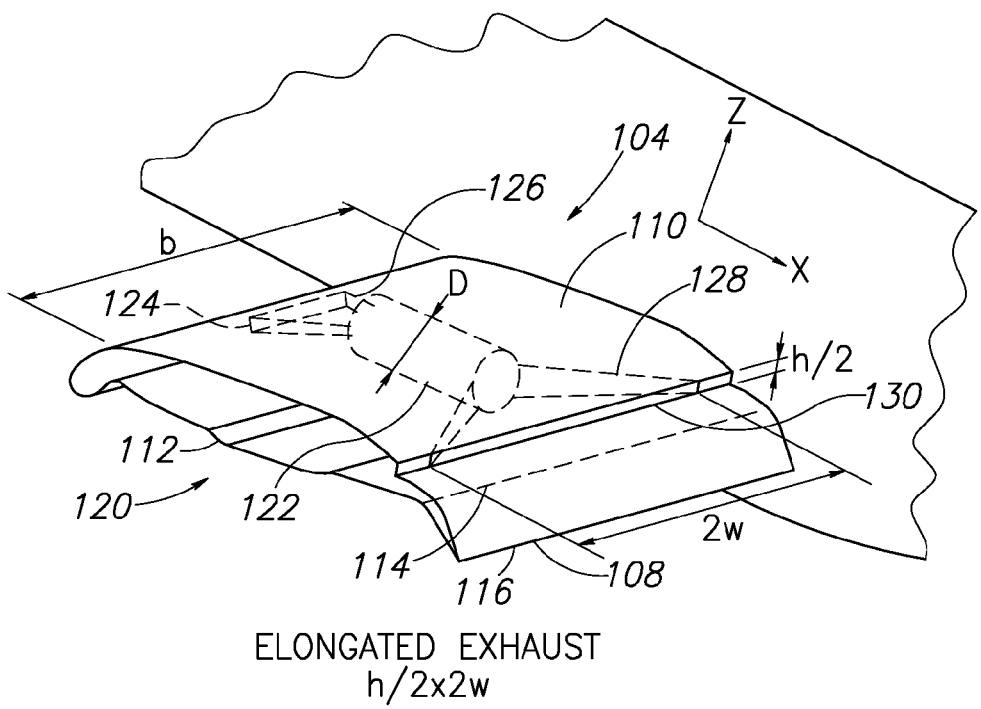
FIG. 4 is an isometric partial view of a the inboard segment of wing assembly having an engine installation including an elongated exhaust aperture in accordance with another embodiment of the invention.
Figures 5, 6:
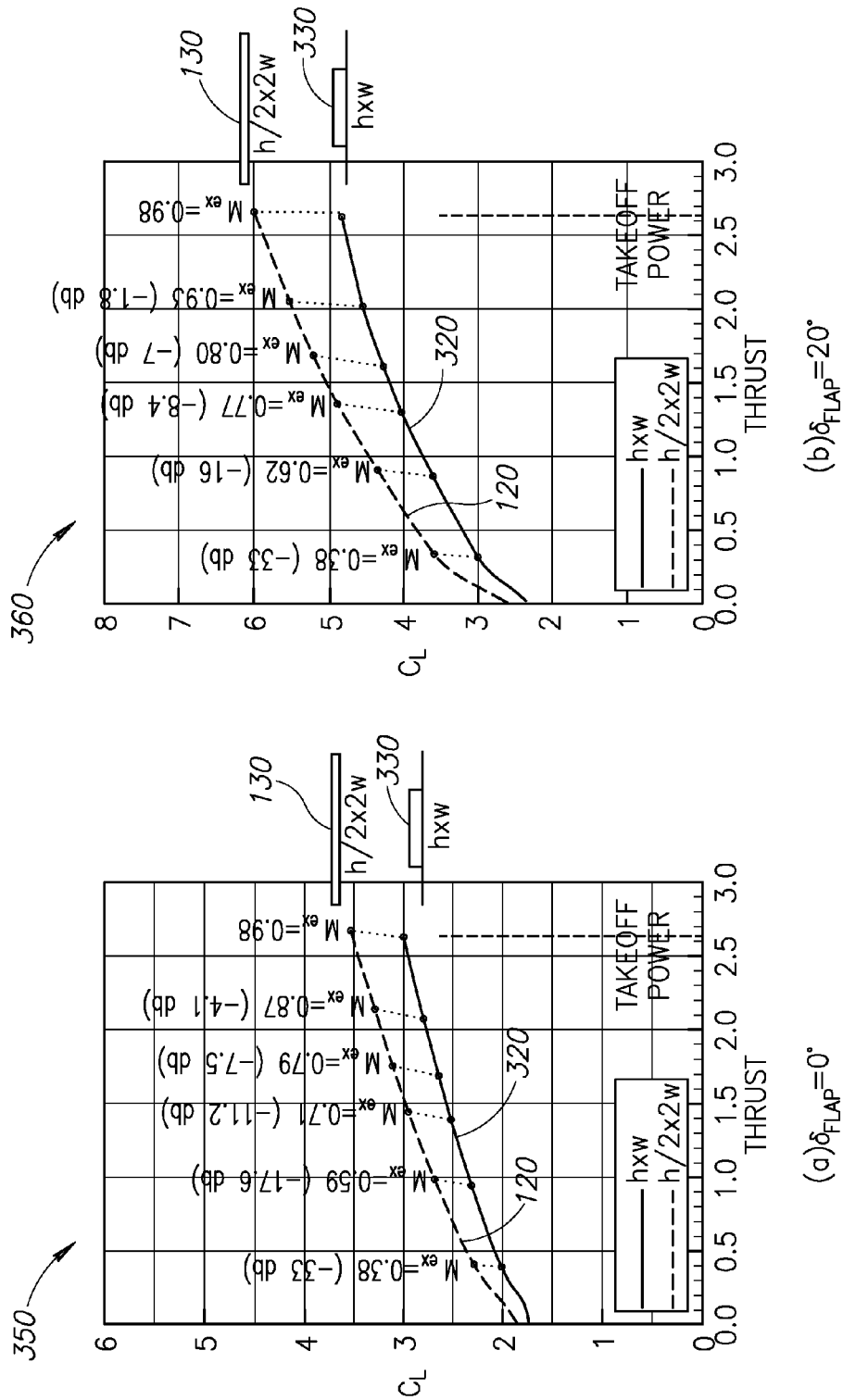
FIG. 5 is a graph showing lift coefficient versus thrust for the engine installations of FIGS. 3 and 4 for a flap deflection angle of zero degrees.
FIG. 6 is a graph showing lift coefficient versus thrust for the engine installations of FIGS. 3 and 4 for a flap deflection angle of twenty degrees.

Now turning back to the engine installation 120, FIG. 4 is an isometric partial view of the inboard wing segment having the engine installation 120 of the aircraft 100 of FIGS. 1 and 2. The engine installation 120 includes some of the same components as the baseline engine installation 320 described above, including the inlet 124, the diffuser 126, and the engine 122. In this embodiment, however, an exhaust duct 128 extends from the engine 122 to an elongated exhaust aperture 130 that has a substantially larger aspect ratio AR in comparison with the baseline exhaust aperture 330 (FIG. 3). More specifically, the exhaust aperture 130 is substantially elongated in a span-wise direction in comparison with the baseline exhaust aperture 330. Also, the cross-sectional shape of the exhaust duct 128 may vary considerably along its length, and as shown in FIG. 3, may transition from an approximately circular shape at a first end proximate the engine 122 to an approximately elongated rectangular shape at a second end proximate the elongated exhaust aperture 130.

More specifically, at the same design operating condition (e.g. maximum power setting, takeoff power setting, etc.), the exhaust aperture 130 may have a reduced height of h/2 and an elongated width of 2w. Thus, the exhaust aperture 130 provides the same exit area as the baseline exhaust aperture 330, but the aspect ratio AR of the elongated exhaust aperture 130 (4w/h) is approximately 24 (see embodiment 00 of FIG. 17), or approximately 6.7 times greater than the aspect ratio AR of the baseline exhaust aperture 330 (w/h) at the same design operating condition of the engine 122. In alternate embodiments, the aspect ratio AR of exhaust apertures in accordance with the teachings of the present disclosure may be greater than or less than that of the particular configurations shown in FIGS. 3 and 4, as described more fully below with respect to FIG. 17.

In some embodiments, a set of actuators may be used to move an ensemble of interlocking leaves which collectively form the exhaust duct 128 and the exhaust aperture 130. The cross section of the exhaust duct 128 can be controlled by the actuators depending on the flight conditions. Such actuation systems may employ hydraulic, electric, or shape-memory-alloy (SMA) actuation, or any other desired method of actuation. Suitable systems and methods for this purpose include, for example, the systems and methods generally described in U.S. Pat. No. 7,004,047 B2 issued to Rey et al., U.S. Pat. No. 5,893,518 issued to Bruchez et al., U.S. Pat. No. 5,245,823 issued to Barcza, U.S. Pat. No. 4,994,660 issued to Hauer, U.S. Pat. No. 4,245,787 issued to Freid, U.S. Pat. No. 4,000,610 issued to Nash et al., and in published U.S. patent application Ser. No. 11/049,920 by Rey et al., and U.S. patent application Ser. No. 11/014,232 by Webster.

As further shown in FIG. 4, the exhaust aperture 130 of the engine installation 120 may be located upstream of a hinge line (or intersection line) 114 formed by deflection of the flap 108. Alternately, the exhaust aperture 130 may be disposed upstream or downstream of the hinge line 114, however, to provide increased lift, the exhaust aperture 130 is desirably positioned upstream from the trailing edge 108 of the flap 116, and is preferably positioned upstream from the hinge line 114 as shown in FIG. 4.

It will be appreciated that the portion of the wing assembly 104 shown in FIG. 4 represents only a span-wise portion of the wing assembly 104 of the aircraft 100 of FIGS. 1 and 2, and in alternate embodiments, engine installations in accordance with the teachings of the present disclosure may include a plurality of engines 122 (e.g. FIG. 1). Each engine 122 may have an exhaust nozzle that terminates in an exit aperture such that the exit apertures of the exhaust nozzles collectively form the entire elongated exhaust aperture 130 shown in FIG. 1. Such an elongated exhaust aperture 130 may extend along most (e.g. greater than 50%) of the trailing edge, or even along approximately the entire trailing edge, of the wing assembly 104. More specifically, in some embodiments, the exhaust aperture 130 extends along the wing assembly 104 in the span-wise direction by at least thirty percent of a semi-span of the wing assembly 104, wherein the semi-span is the distance that a wing projects outwardly from the fuselage of the aircraft (i.e. from wing root to wing tip). In alternate embodiments, the exhaust aperture 130 may extend greater than seventy-five percent of the length of the trailing edge. In the particular embodiment shown in FIG. 1, for example, the exhaust aperture 130 extends along at least approximately eighty percent of the trailing edge of the wing assembly 104.

The performance characteristics of the engine installation 120 (FIG. 4) compare very favorably with those of the baseline engine installation 320 (FIG. 3). For example, FIGS. 5 through 8 show graphs 350, 360, 370, 380 of predicted lift coefficient versus thrust (or engine power setting) at a fixed angle of attack of sixteen degrees for the baseline engine installation 320 (FIG. 3) and the engine installation 120 having the elongated exhaust aperture 130 (FIG. 4) for flap deflection angles $\delta_{Flap}$ (downward deflections of the flap 108) of zero degrees, twenty degrees, forty degrees, and sixty degrees, respectively. More specifically, in these simulations, power setting is varied by changing jet exhaust properties, effectively increasing Mach number at the exhaust aperture for higher engine thrust. The data shown in these graphs 350, 360, 370, 380 show substantial improvement in lift coefficient of the engine installation 120 having the span-wise elongated exhaust aperture 120 in comparison with the baseline engine installation 320 at substantially all power settings and flap deflection angles $\delta_{Flap}$. For example, in the case of a flap deflection angle $\delta_{Flap}$ of zero degrees, the engine installation 120 provides an approximately 16% gain in lift at the takeoff thrust condition. The effectiveness of the elongated exhaust aperture 130 is much more profound at the higher flap deflection angles $\delta_{Flap}$, where the original exhaust results in flow separation at the flap 108 and degradation in lift. In contrast to the progressive lift obtained with the engine installation of FIG. 4, the lift obtained with the baseline engine installation of FIG. 3 peaks at low levels and at low power settings at the forty and sixty degrees flap deflections due to flow separation. It is pointed out that since the aspect ratio of the exhaust aperture in prior art is smaller than that of the baseline engine installation (FIG. 3), the performance of prior art systems is lower than the baseline engine installation shown in FIGS. 5 through 8.

Figure 9:
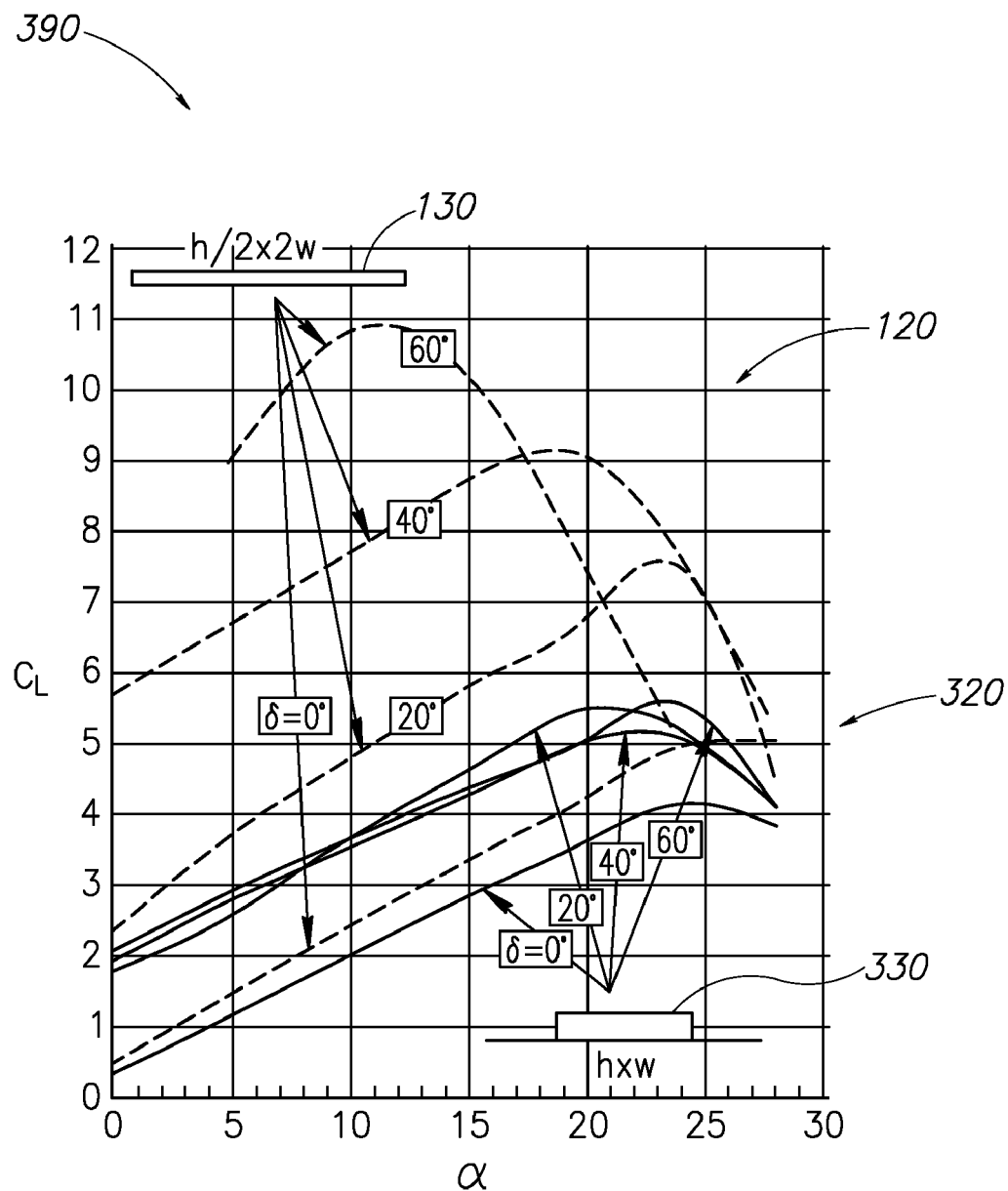
FIG. 9 is a graph showing lift augmentation versus angle of attack the engine installations of FIGS. 3 and 4 at a takeoff power setting.

Similarly, FIG. 9 is a graph 390 showing lift coefficient versus angle of attack for the baseline engine installation 320 and the engine installation 120 having the elongated exhaust aperture 130 at a takeoff power setting. The data shown in FIG. 9 demonstrate the improvement in the lift curves obtained using the engine installation 120 at takeoff power for substantially all flap deflection angles $\delta_{Flap}$.

Figure 10:
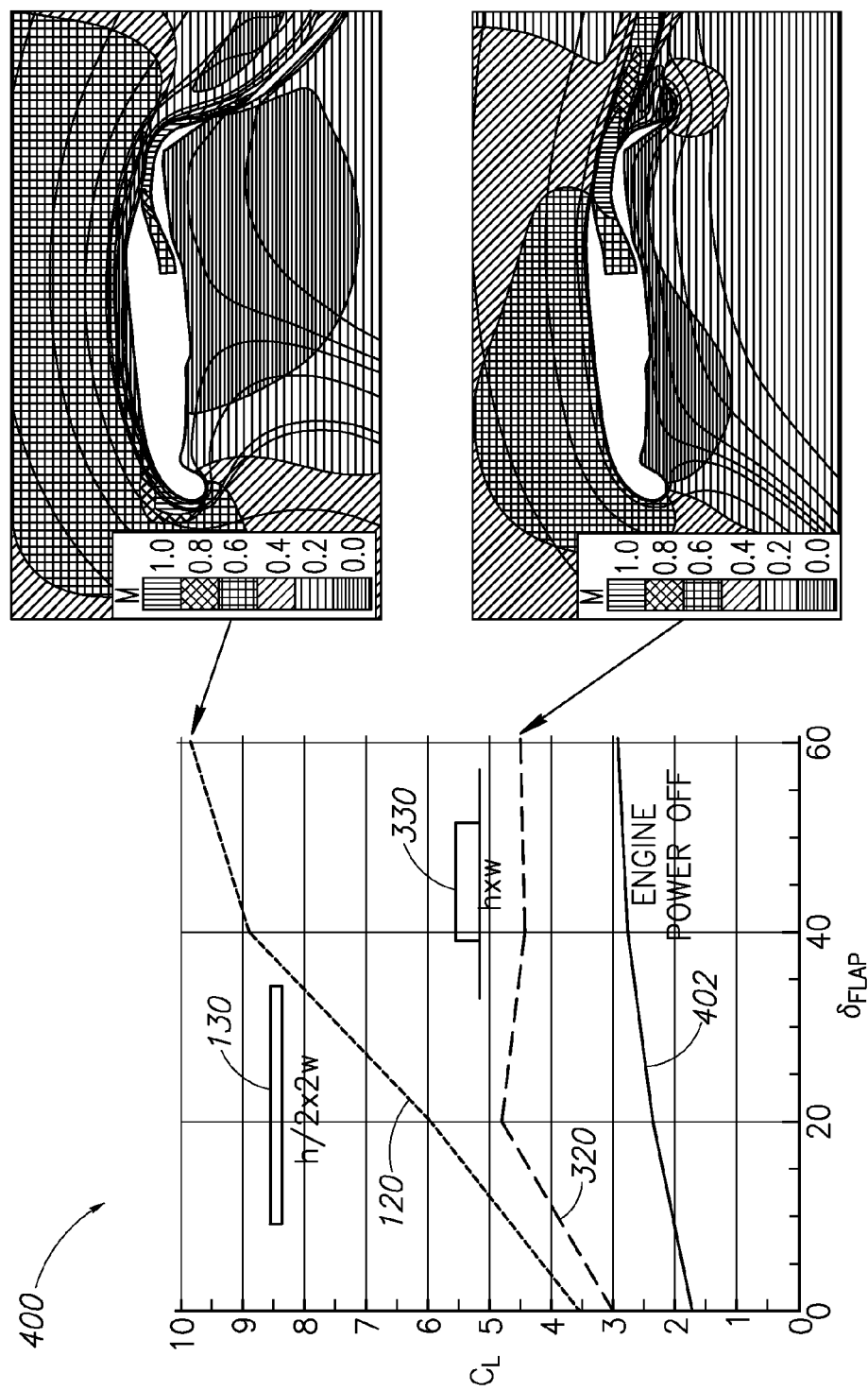
FIG. 10 is a graph showing lift augmentation versus flap deflection and flow structure at the 60 degrees flap deflection for the engine installations of FIGS. 3 and 4 at an angle of attack of sixteen degrees and at takeoff power setting.

FIG. 10 is a graph 400 showing lift augmentation versus flap deflection angle $\delta_{Flap}$ for the baseline engine installation 320 and the engine installation 120 having the elongated exhaust aperture 130 at an angle of attack of sixteen degrees and at a takeoff power setting. For comparison, an engine-power-off data set 402 is also provided. Relative to the baseline engine installation 320 which exhibits reversal in lift gain at around the flap deflection angle $\delta_{Flap}$ of twenty five degrees, the engine installation 120 having the elongated exhaust aperture 130 shows continual lift increment up to the flap deflection angle $\delta_{Flap}$ of sixty degrees. FIG. 10 also shows the flow structure (Mach number flowfield and streamlines) at the flap deflection angle of sixty degrees, indicating the elimination of flow separation and the efficient flow turning obtained with the elongated exhaust aperture 130.

Figure 11:
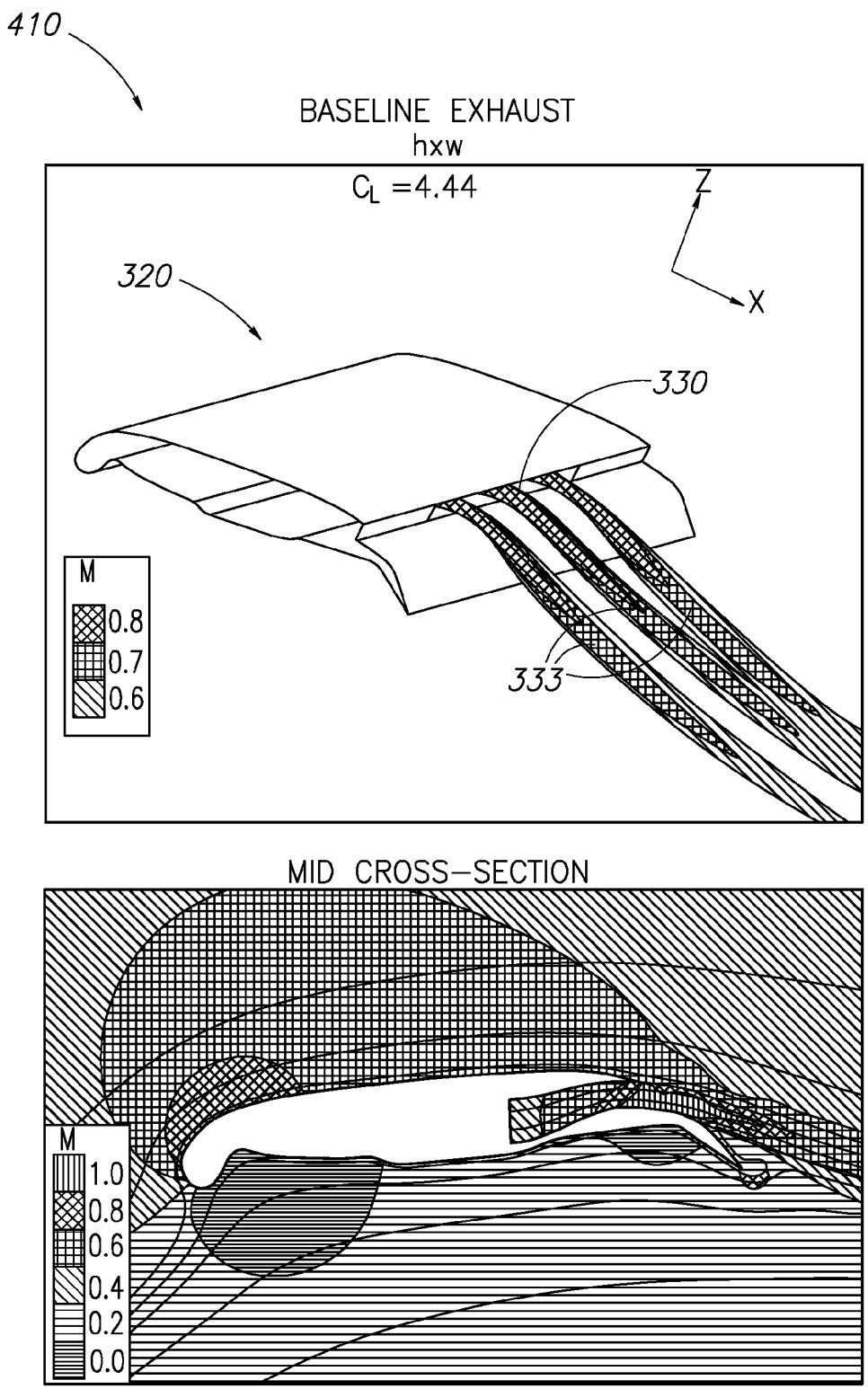
FIG. 11 shows isometric and side partial views of a flow structure surrounding the baseline engine installation of FIG. 3.
Figure 12:
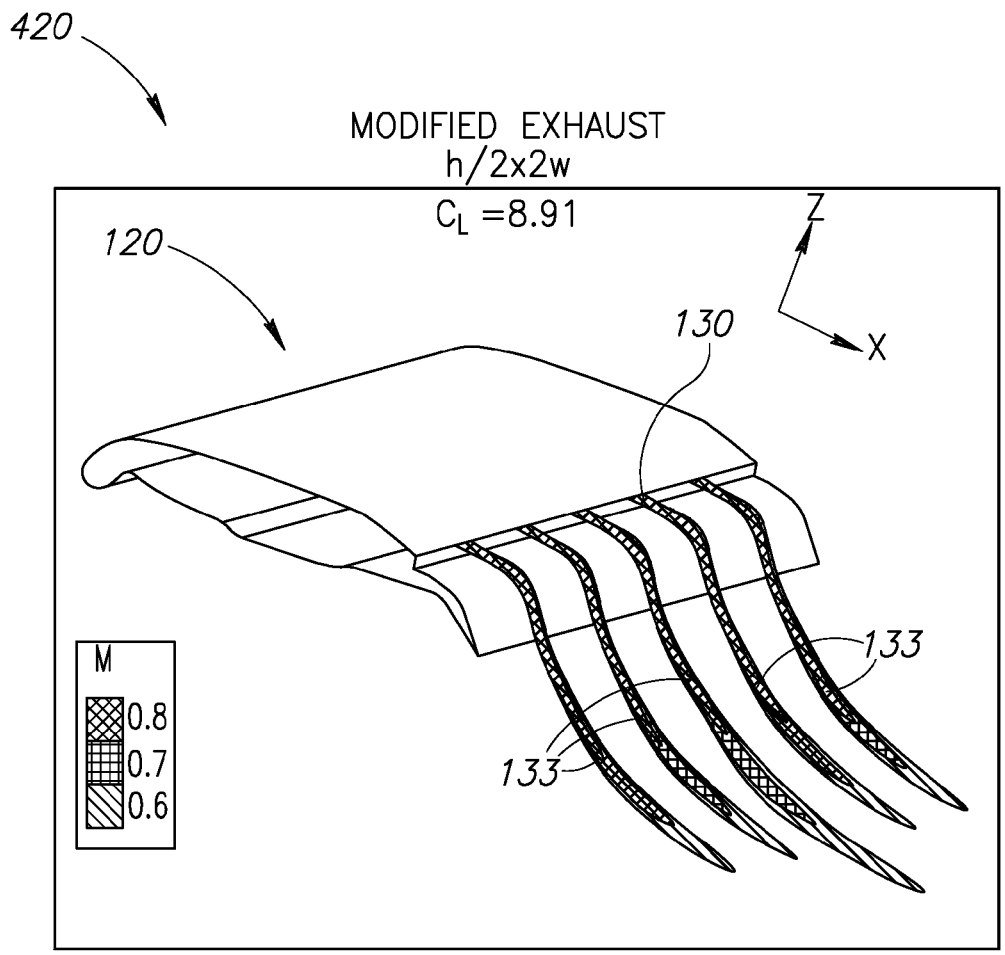
FIG. 12 shows isometric and side partial views of a flow structure surrounding the engine installation having an elongated exhaust aperture of FIG. 4.
Figure 12:
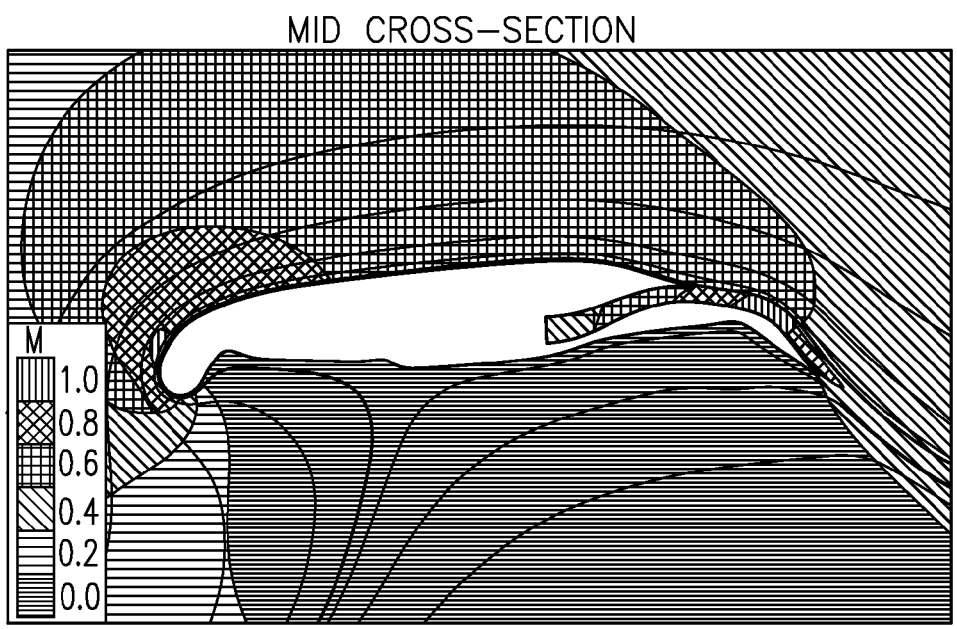

FIGS. 11 and 12 show flow structures 410, 420 of the baseline engine installation 320 and the engine installation 120 having the elongated exhaust aperture 130, respectively, at the angle of attack of sixteen degrees, for the flap deflection angle of forty degrees $\delta_{Flap}$ and at takeoff power. The respective engine exhaust plumes are shown by the vertical traverse cuts 333, 133. As shown in the lower portion of FIG. 11, at these operating conditions, the baseline engine installation 320 results in a sizeable region of flow separation over the upper surface of the flap 108. The ineffectual flow turning in the aft portion of the wing assembly for the baseline engine installation 320 results in significant lift deterioration. In comparison, as best shown in the lower portion of FIG. 12, the engine installation 120 having the elongated exhaust aperture 130 produces streamlined flow which remains attached over the entire flap 108. The efficient flow turning provided by the engine installation 120 results in enhanced global circulation and significantly larger lift augmentation.

It will be appreciated that a variety of systems and methods in accordance with the teachings of the present disclosure may be conceived, and that the invention is not limited to the particular embodiments described above and shown in the accompanying figures. For example, in alternate embodiments, engine installations in accordance with the present disclosure may be integrated into a variety of different wing assemblies having different cross-sectional shapes from that shown in FIGS. 3 and 4, and may include contouring of the upper (and lower) surfaces of the wing assembly.

Figure 13:
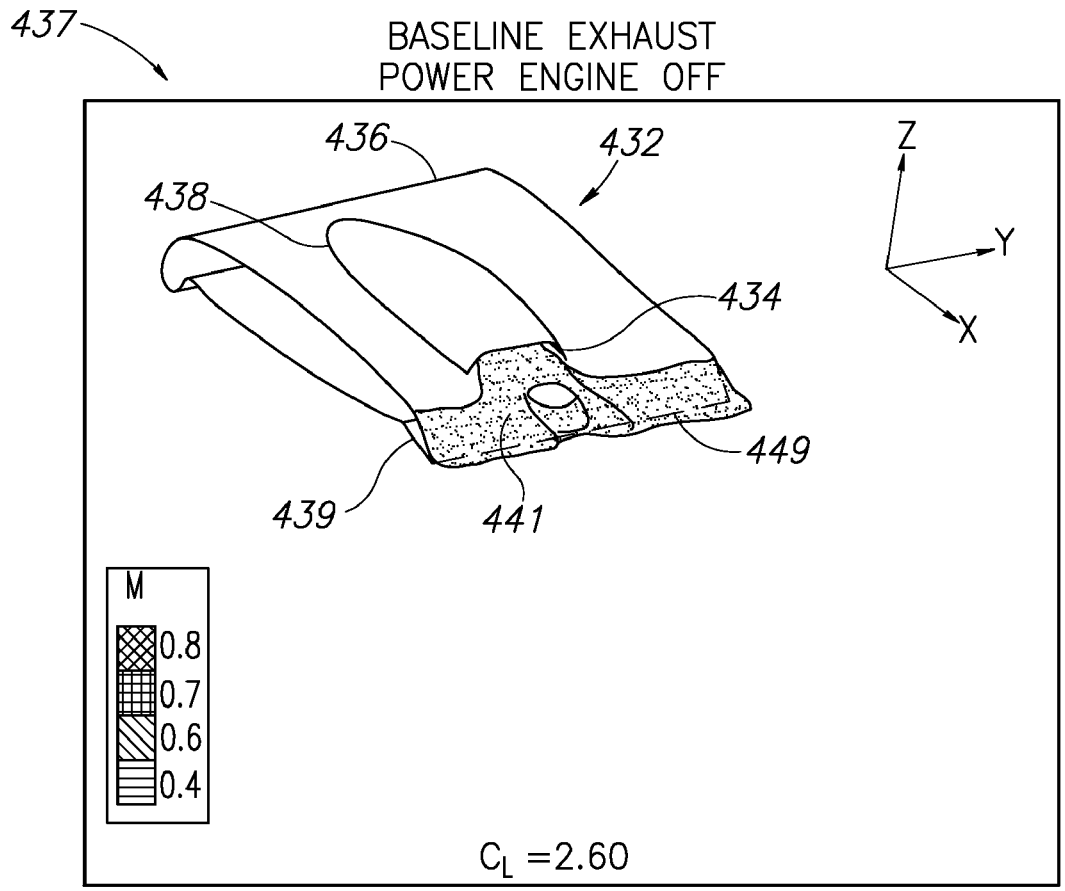
FIG. 13 shows a flow structure surrounding prior art engine installation having an exhaust aperture at power setting of zero.
Figure 13:
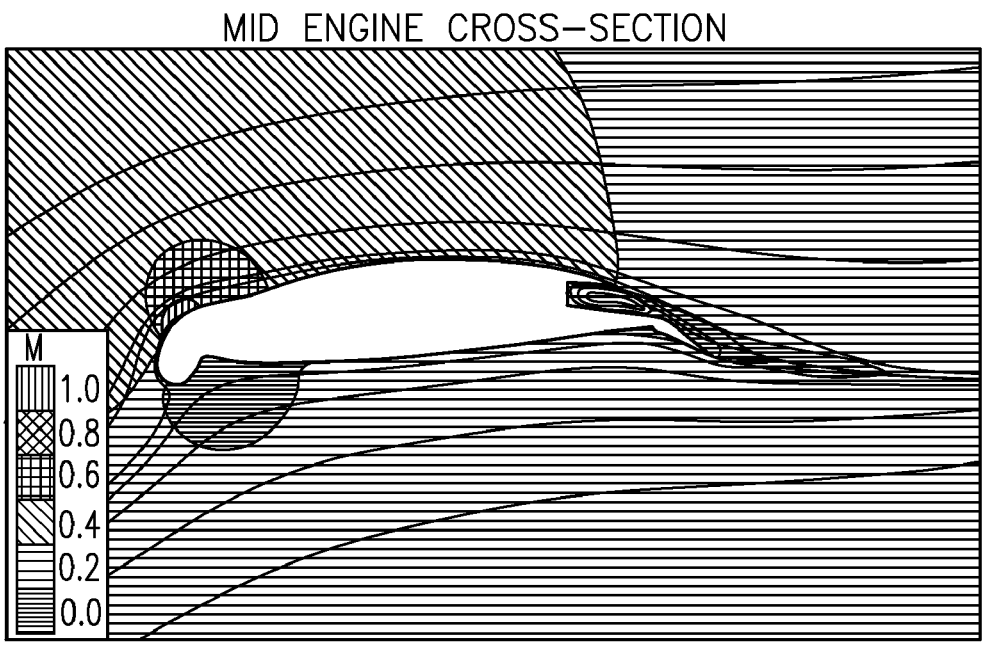

More specifically, FIG. 13 shows isometric and side cross-sectional views of a flow structure surrounding an engine installation 432 typical of prior art having an exhaust aperture 434 operating at a power setting of zero. In this case, an upper surface 436 of a wing assembly 437 includes a fairing portion 438. The fairing portion 438 is generally configured to aerodynamically integrate the exhaust aperture 434 (and possibly other components of the engine installation 432) with the wing assembly 437. In some aspects, the fairing portion 438 may represent a capped (or covered) inlet that would otherwise be disposed within the upper surface 436 to allow airflow to enter the engine. Alternately, the inlet may be uncapped (or not covered), and the fairing portion 438 may simply serve to integrate the exhaust aperture 434 and other components with the wing assembly 437 in a relatively smooth manner.

Figure 14:
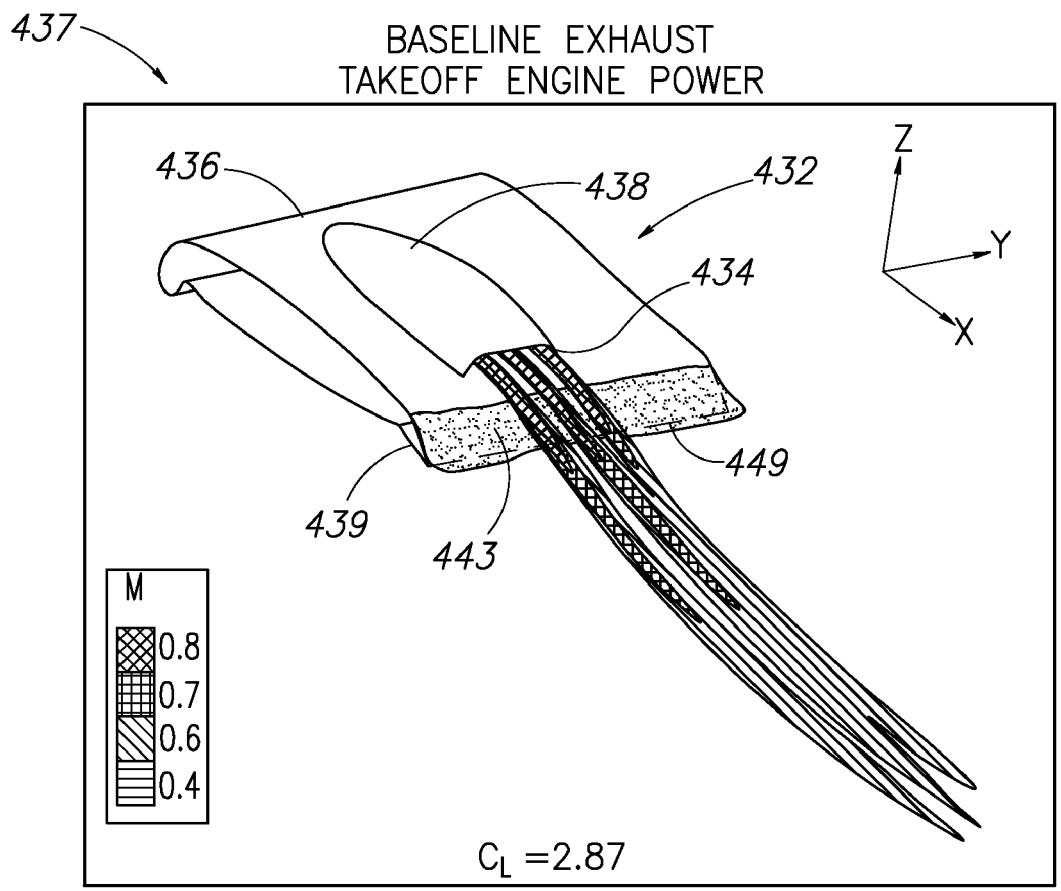
FIG. 14 shows a flow structure surrounding the prior art engine installation of FIG. 13 at takeoff power setting.
Figure 14:
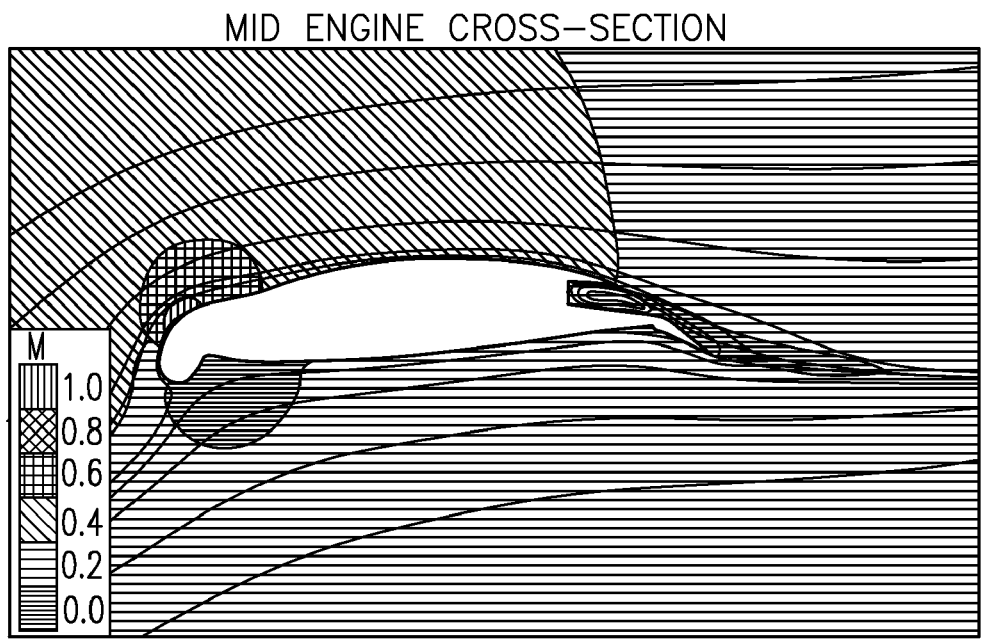
Figure 15:
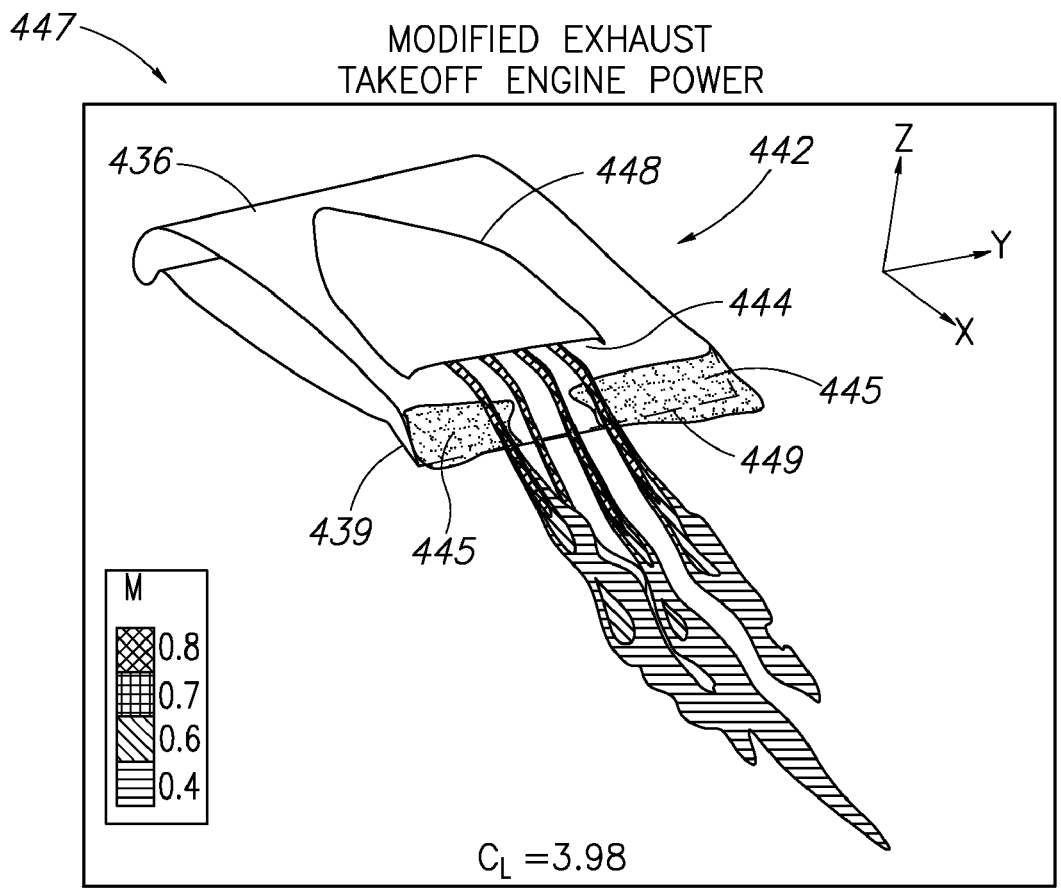
FIG. 15 shows a flow structure surrounding an engine installation having an elongated exhaust aperture at takeoff power setting.
Figure 15:
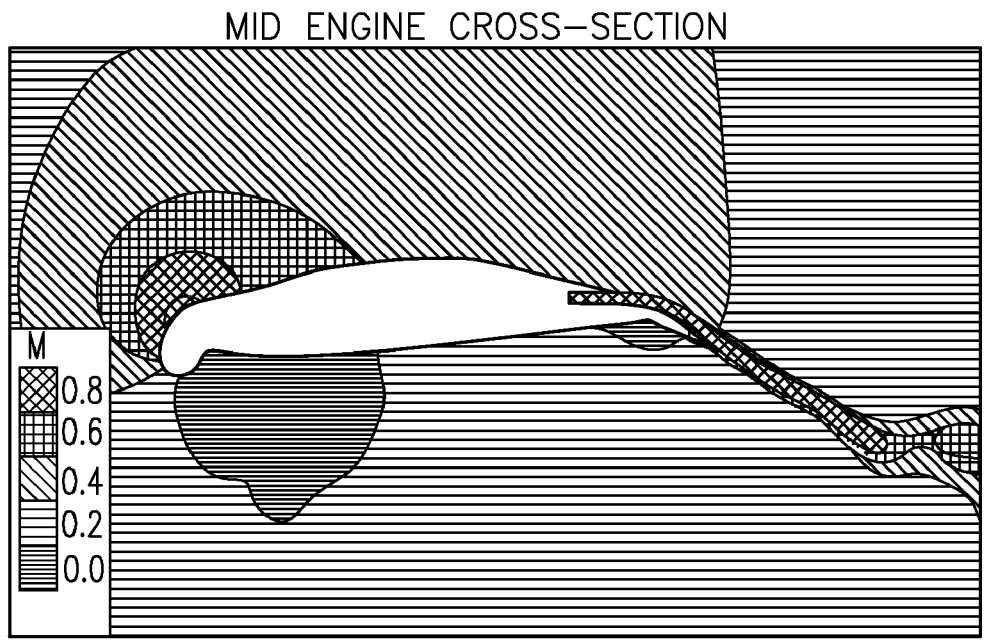

The flow structure surrounding the engine installation 432 at a takeoff power setting is shown in FIG. 14. Similarly, FIG. 15 shows a flow structure surrounding an engine installation 442 having an elongated exhaust aperture 444 according to the present disclosure (as described above with respect to FIG. 4) at a takeoff power setting. In this embodiment, to accommodate the elongated exhaust aperture 444, a wing assembly 447 includes an elongated (span-wise) fairing portion 448.

The cross sections of the exhaust ducts (or nozzles) extending from the engines (not shown) to the exhaust apertures 434, 444 of the engine installations 432, 442 may be generally defined by rectangular shapes with rounded corners. In this case the exhaust areas are identical for the baseline exhaust aperture 434 and the elongated exhaust aperture 444 in order to ensure same engine thrust. In the configurations shown in FIGS. 13-15, the engine installations 432, 442 are operating at an angle of attack of sixteen degrees, and a flap element 439 spans the entire section of the wing assemblies 437, 447 and is deflected at an angle $\delta_{Flap}$ of thirty degrees.

As shown in FIG. 13, the engine installation 432 of prior art with a power setting of zero results in separated flow 441 spanning the entire flap element 439 and extending beyond the trailing edge 449 of the flap. At the takeoff power level shown in FIG. 14, the exhaust flow prevents the formation of flow reversal right behind the exhaust aperture 434, and mildly reduces the separation on the flap element 439 in the area immediately downstream of the exhaust aperture 434, however, the flow over the flap element 439 remains by and large fully separated and only modest lift gain is realized (443 denotes the separation pocket). In contrast, as shown in FIG. 15, the exhaust from the elongated exhaust aperture 444 is very effective in suppressing flow reversal downstream of the exhaust aperture 444 and the added circulation results in lift boost up. The resultant separation bubbles 445 are also shown. In this particular example, the lift gain due to engine power obtained with the elongated exhaust aperture is more than five times the lift gain obtained with the system representing prior art.

Figure 7:
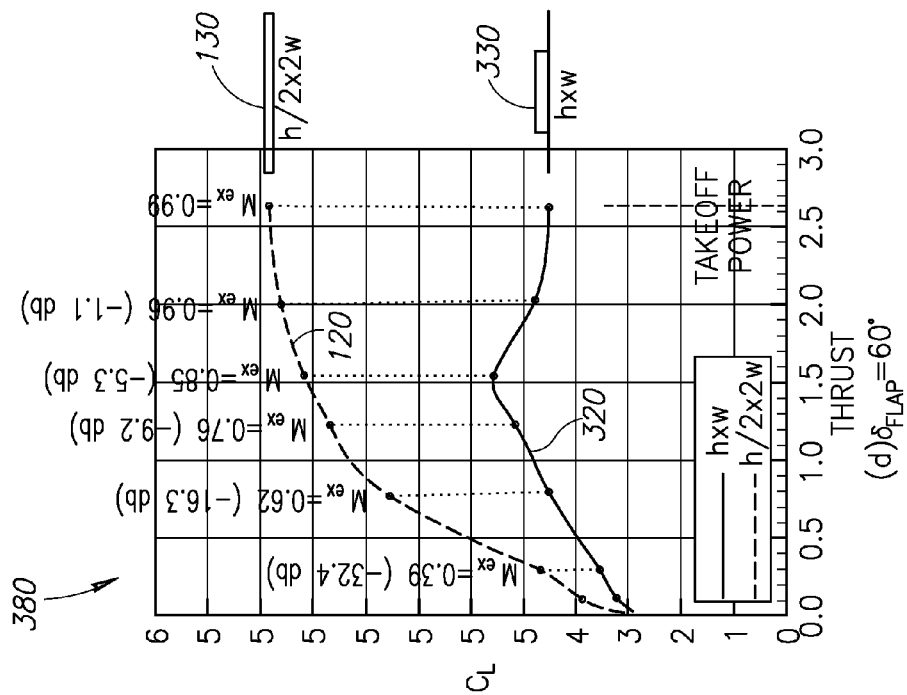
FIG. 7 is a graph showing lift coefficient versus thrust for the engine installations of FIGS. 3 and 4 for a flap deflection angle of forty degrees.
Figure 8:
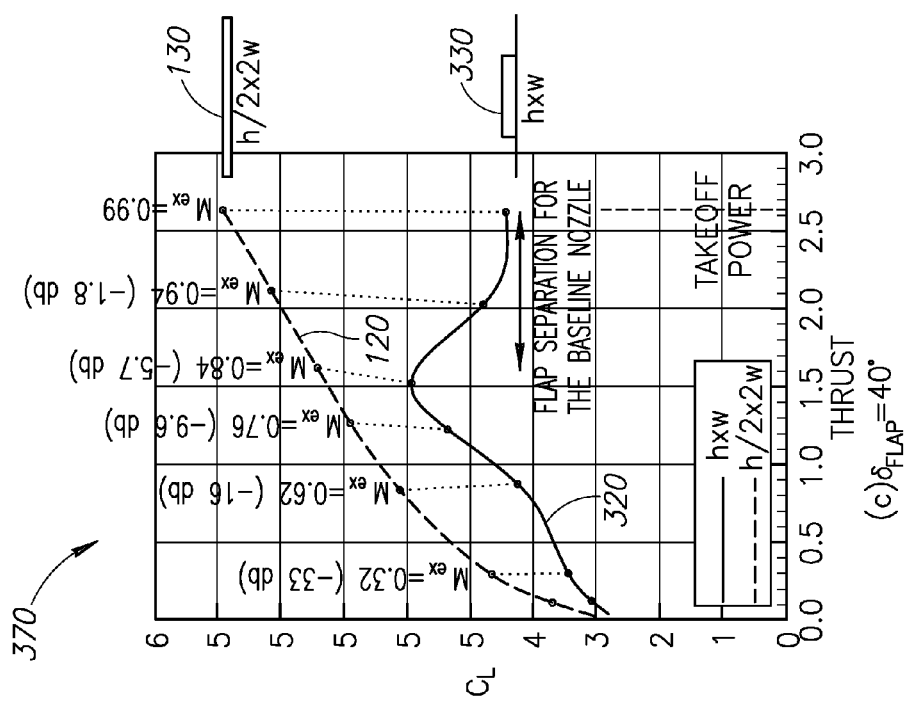
FIG. 8 is a graph showing lift coefficient versus thrust for the engine installations of FIGS. 3 and 4 for a flap deflection angle of sixty degrees.

Based on the foregoing discussions and the accompanying figures, it should be appreciated that the underlining aerodynamic performance is substantially altered for high AR nozzles in accordance with the teachings of the present disclosure. The flow is highly efficient since it is not separated anymore on the flap, as shown in FIGS. 7, 8, and 10. Thus, the flow phenomenon has changed, and it is not a result of trivial optimization. Flow separation (i.e., aerodynamic inefficiency) is noted by the lift coefficient ($C_L$) peaks achieved for the large flap deflections (FIGS. 7, 8), and the inability to produce lift beyond 20 degrees flap (FIG. 10).

Embodiments of exhaust systems and methods in accordance with the present disclosure may provide significant advantages over the prior art. For example, embodiments of the exhaust systems having span-wise elongated exhaust apertures may enhance high-lift capability. Improved high-lift capability allows the use of larger payloads, smaller engines or shorter runways. Thus, significant advantages with respect to engine and airplane sizing, and associated operational costs, may be achieved. In addition, the flap system may be structurally simpler since there may be no need to have span breaks/discontinuities in flap elements. In the prior art flap system, there are separate flaps at different span segments (regions where there is nozzle exhaust and regions where there is no exhaust). Thus, embodiments of the invention may provide flap systems having reduced weight, reduced manufacturing costs, and reduced maintenance costs in comparison with the prior art.

Figure 16:
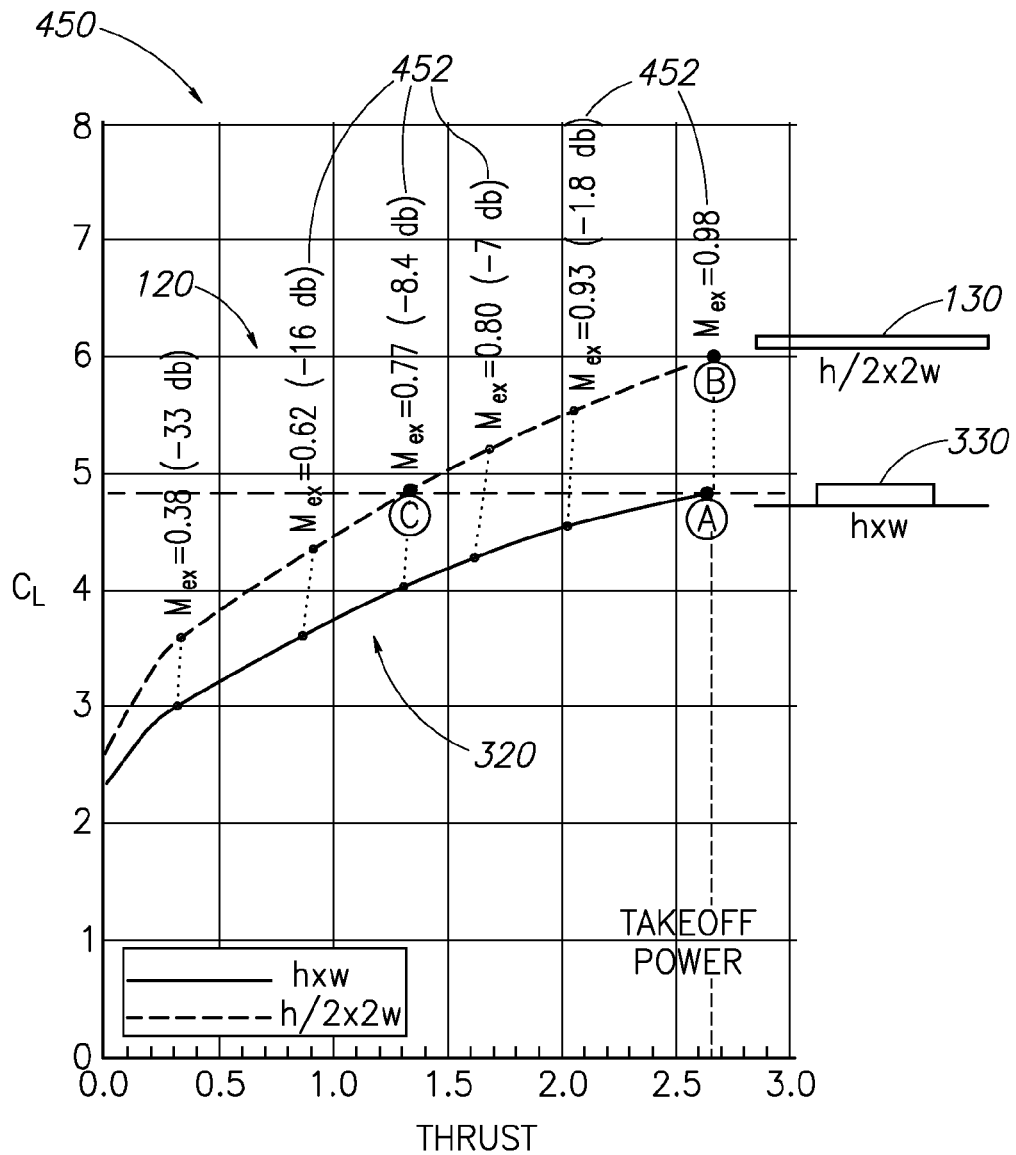
FIG. 16 is a graph showing lift augmentation versus thrust, including noise reduction data, for the engine installations of FIGS. 3 and 4.

In addition, other advantages may include improvements in noise levels, particularly during the important takeoff and landing flight segments. Further embodiments of the invention may also reduce emissions and reduce airplane infrared observability. For example, FIG. 16 is a graph 450 showing lift augmentation versus thrust as provided above in FIG. 6 for the engine installations of FIGS. 3 and 4. Also shown in FIG. 16 are noise differentials 452 between the baseline engine installation 320 and the engine installation 120 having the elongated exhaust aperture 130. At takeoff power the elongated exhaust aperture (or elongated nozzle) 130 produces lift of 6.0 (point B), representing a 20% improvement over the baseline (A). If lift similar to the level produced by the baseline exhaust aperture (or nozzle) 330 ($C_L$=4.83) is sought, however, the modified nozzle 130 can be operated at a lower thrust level of about 1.35 (C). The exit Mach number of the exhaust at this condition is reduced to 0.77. Since exhaust noise is proportional to jet velocity (exponent of 8), profound reduction in noise level can be realized in this case (~8 decibels in this example).

With continued reference to FIG. 16, the B-C segment represents a set of conditions for the elongated nozzle 130 having combined high-lift performance improvement and low noise signature. Moreover, lower thrust requirement leads to smaller lower-rated engines, reduced airplane weight, fuel consumption and maintenance costs. From regulatory and environmental standpoints, in addition to the lower airplane noise advantage of smaller engines there is a great opportunity for curbing turbojet emissions. Embodiments of the invention may also advantageously reduce infrared signature.

Figure 17:
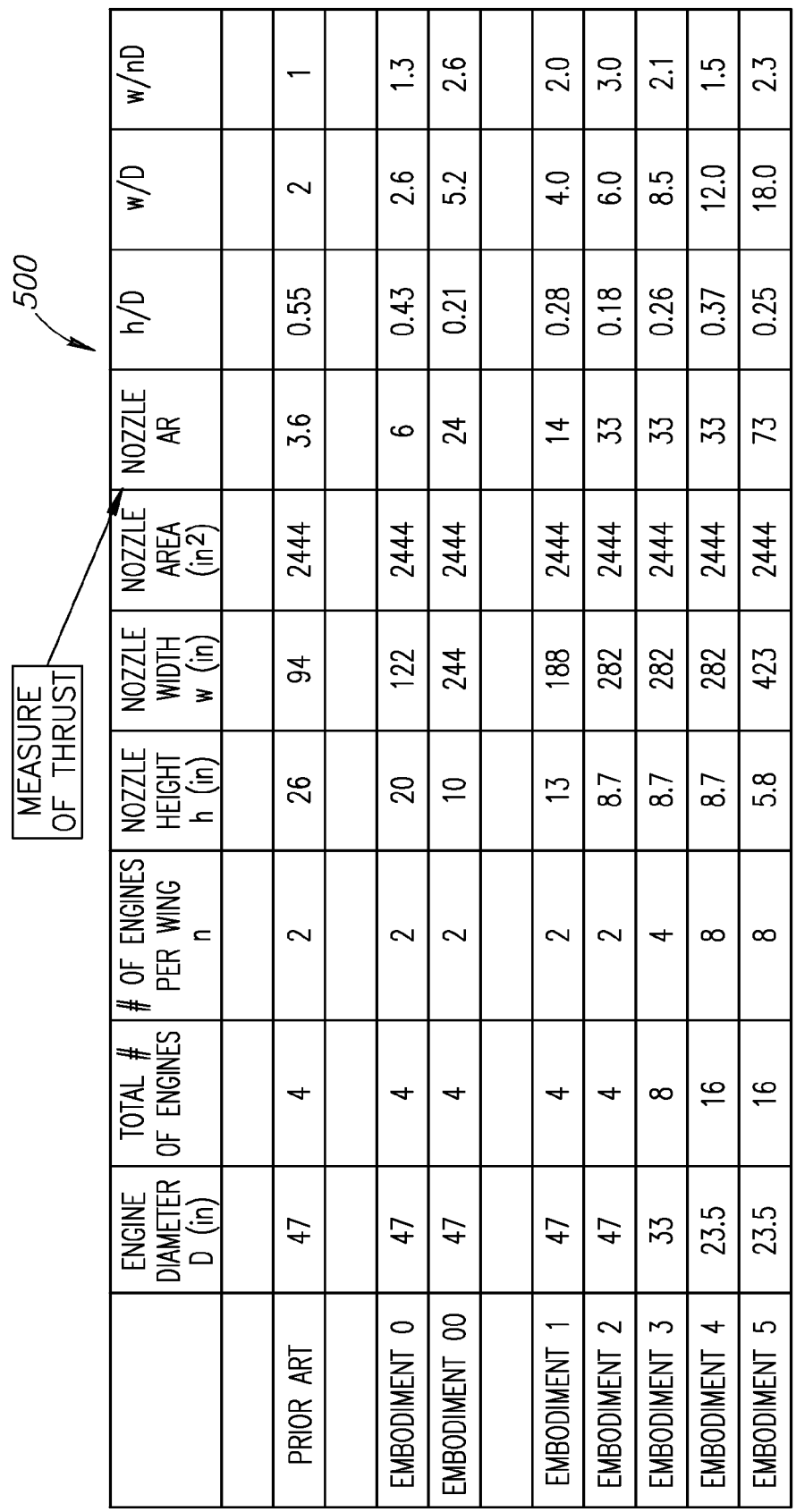
FIG. 17 is a table showing various propulsion and exhaust system parameters for a representative prior art system and for several exhaust systems in accordance with various embodiments of the invention.

Comparisons between various embodiments of exhaust systems in accordance with the invention and an example exhaust system of the prior art will be made to facilitate an understanding of various aspects of such embodiments. For example, FIG. 17 is a table 500 showing various propulsion system parameters for a representative prior art system and for several propulsion systems in accordance with various embodiments of the invention. Schematic representations of several of the exhaust systems listed in the table 500 of FIG. 17 are depicted in FIGS. 18-22.

Figure 18:
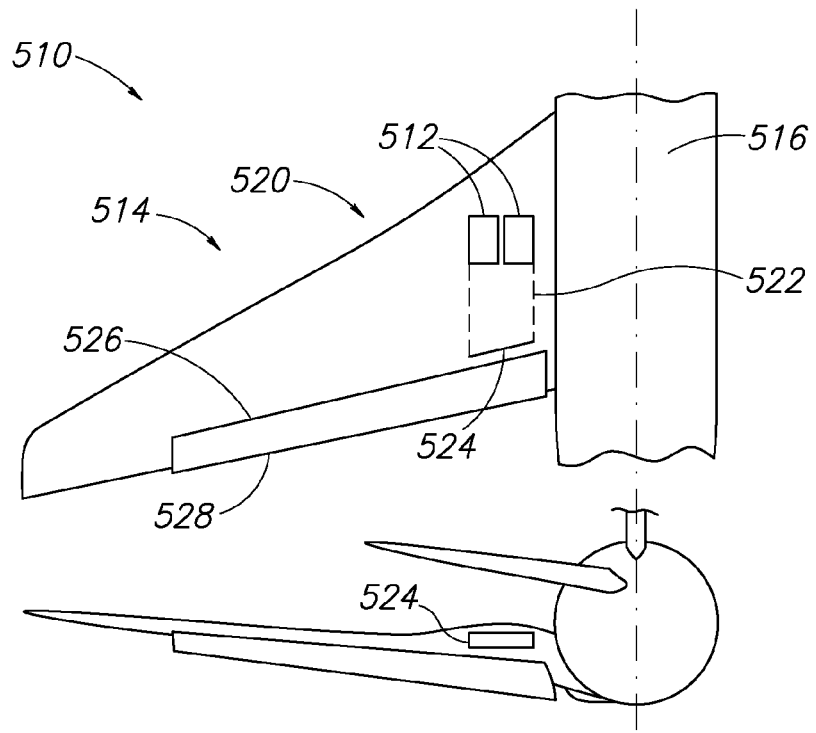
FIG. 18 is a schematic plan view of the prior art exhaust system of FIG. 17.

More specifically, FIG. 18 is a schematic representation of an integrated propulsion system 510 having an exhaust system 520 corresponding to the prior art exhaust system listed in table 500 (FIG. 17). The propulsion system 510 includes a pair of engines 512 integrated into a wing assembly 514 that extends outwardly from a fuselage 516 of an aircraft. An exhaust duct 522 of the exhaust system 520 extends rearwardly from the engines 512 to an exhaust aperture 524. In this embodiment, the exhaust aperture 524 is positioned slightly upstream of a flap hinge line 526 of a flap 528 of the wing assembly 514. In a lower portion of FIG. 18, an end-view shape of the exhaust aperture 524 is shown.

Referring to table 500 of FIG. 17, the exhaust aperture 524 of the representative prior art exhaust system 520 has an aspect ratio AR of 3.6, a height-over-engine-diameter ratio h/D of 0.55, and a width-over-engine-diameter ratio w/D of 2. In terms of prior art exhaust systems, this particular example represents an exhaust system having an unusually high aspect ratio AR.

Figure 19:
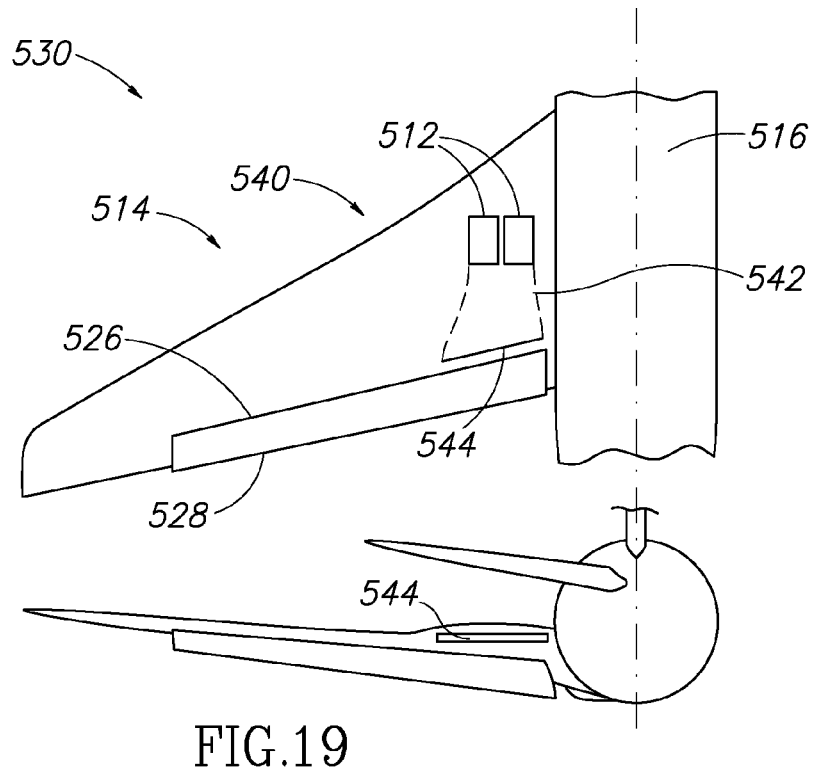
FIGS. 19-22 are schematic plan and rear views of various exhaust system embodiments in accordance with the invention corresponding to the table of FIG. 17.

FIGS. 19 through 22 show schematic views of integrated propulsion systems 530, 550, 570, 590 having exhaust systems 540, 560, 580, 600 corresponding to Embodiments 1, 2, 3, and 5, respectively, listed in table 500 of FIG. 17. In FIG. 19, the exhaust system 540 includes the engines 512 as in the prior art exhaust system 520. An exhaust duct 542 extends rearwardly from the engines 512 to an exhaust aperture 544 having an aspect ratio AR of 14. Thus, the aspect ratio AR of the exhaust aperture 544 of the first embodiment (FIG. 17) is approximately 4 times greater than the aspect ratio AR of the prior art exhaust aperture 524.

Figure 20:
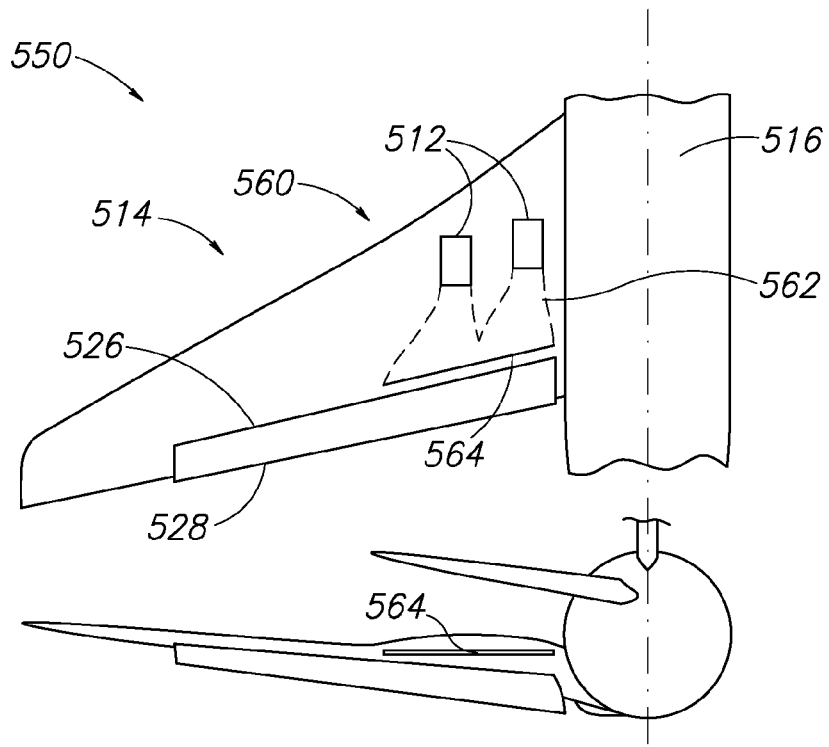

Similarly, in FIG. 20 the exhaust system 560 corresponding to the second embodiment of the table 500 (FIG. 17) includes the engines 512 as in the prior art exhaust system 520. A plurality of exhaust ducts 562 extend rearwardly from the engines 512 to an exhaust aperture 564 having an aspect ratio AR of 33, which is approximately 9 times greater than the aspect ratio AR of the prior art exhaust aperture 524.

Figure 21:
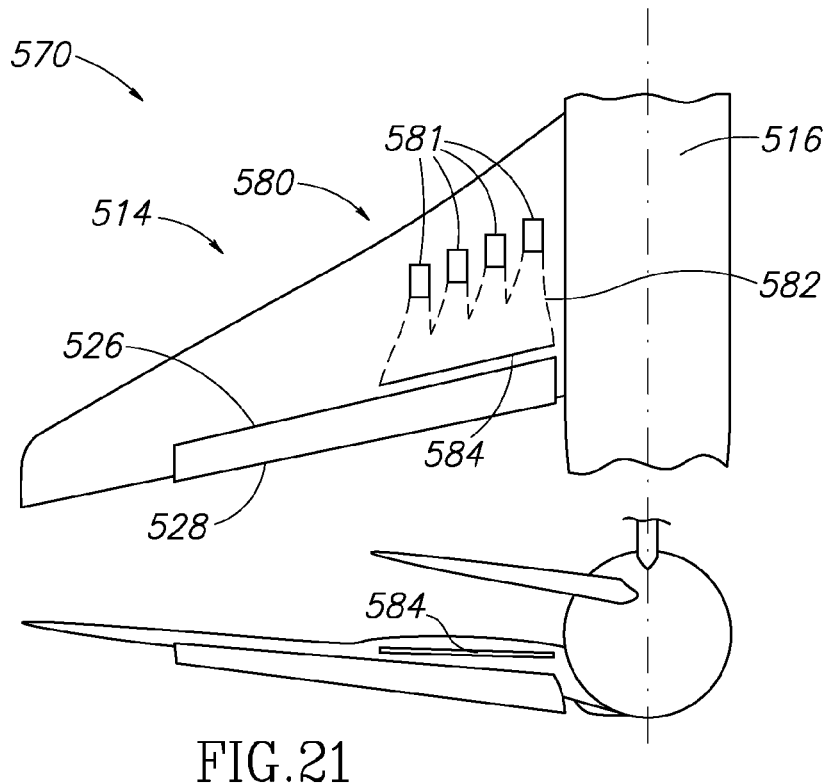

In FIG. 21, the exhaust system 580 of the third embodiment of the table 500 (FIG. 17) includes a plurality of engines 581 that are smaller than the engines 512 of the previously described embodiments and producing the same thrust as the previously described embodiments. A plurality of exhaust ducts 582 extend rearwardly from the engines 581 to an exhaust aperture 584 having an aspect ratio AR of 33, which is again approximately 9 times greater than the aspect ratio AR of the prior art exhaust aperture 524.

Figure 22:
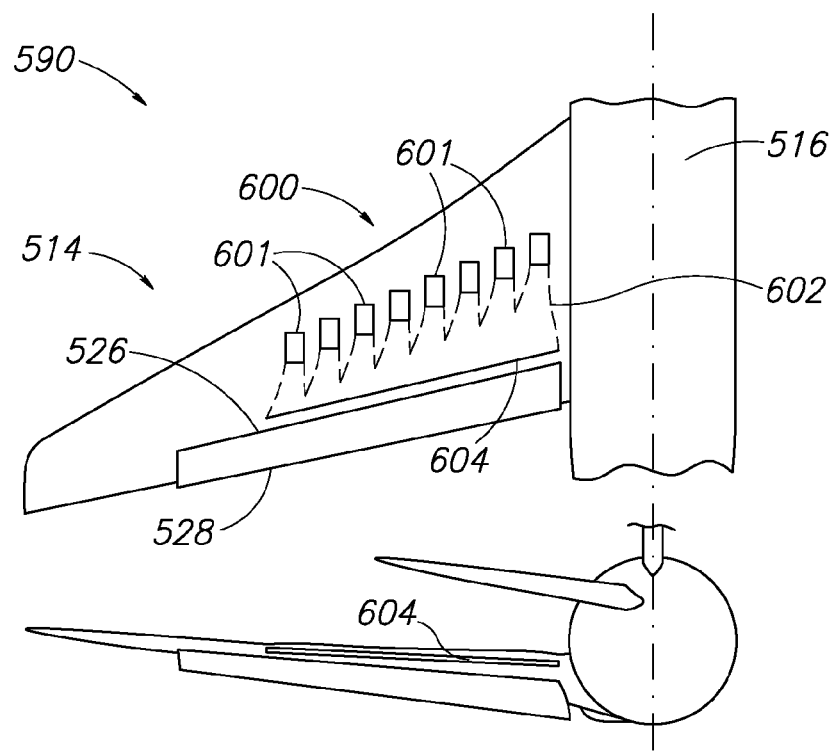

In FIG. 22, the exhaust system 600 of the fifth embodiment of the table 500 (FIG. 17) includes a plurality of engines 601 that are smaller than the engines 512, 581 of the previously described embodiments and producing the same thrust as the previously described embodiments. A plurality of exhaust ducts 602 extend rearwardly from the engines 601 to an exhaust aperture 604 having an aspect ratio AR of 73, which is approximately 20 times greater than the aspect ratio AR of the prior art exhaust aperture 524.

With continued reference to FIG. 17, in general, embodiments of exhaust systems in accordance with the teachings of the present disclosure have aspect ratios AR and widths w/D that are substantially greater than the prior art, and heights h/D that are substantially smaller than the prior art. More specifically, the aspect ratios AR of the particular embodiments shown in FIG. 17 range from 14 to 73, or approximately four times to approximately twenty times the aspect ratio AR of the unusually high aspect ratio example of the prior art. In other embodiments, the aspect ratios AR of embodiments in accordance with the invention may range from approximately 5 to a value greater than 73 (e.g. 100). Similarly, the embodiments of the invention shown in FIG. 17 exhibit values of the width-over-engine-diameter w/D ratio ranging from 4 to 18, however, in further embodiments, the values of the width-over-engine-diameter w/D may range from approximately 3 to values in excess of 18.

Figure 23:
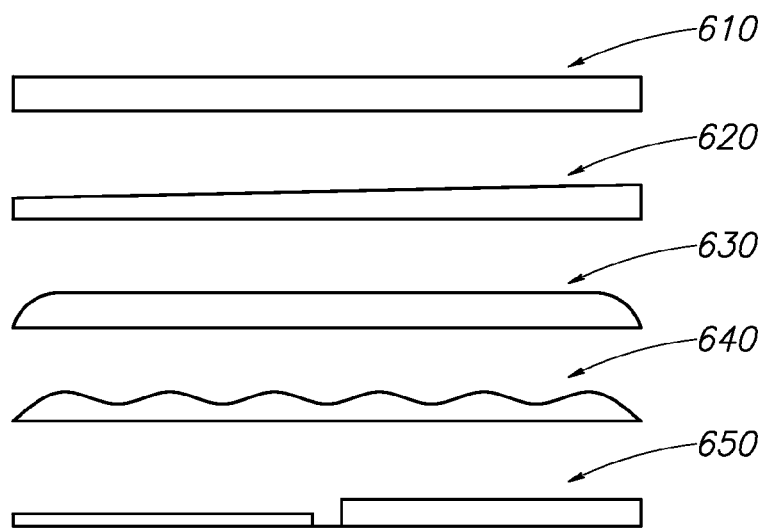
FIG. 23 shows rear views of several representative exhaust apertures of exhaust systems in accordance with various alternate embodiments of the invention.
Figure 24:
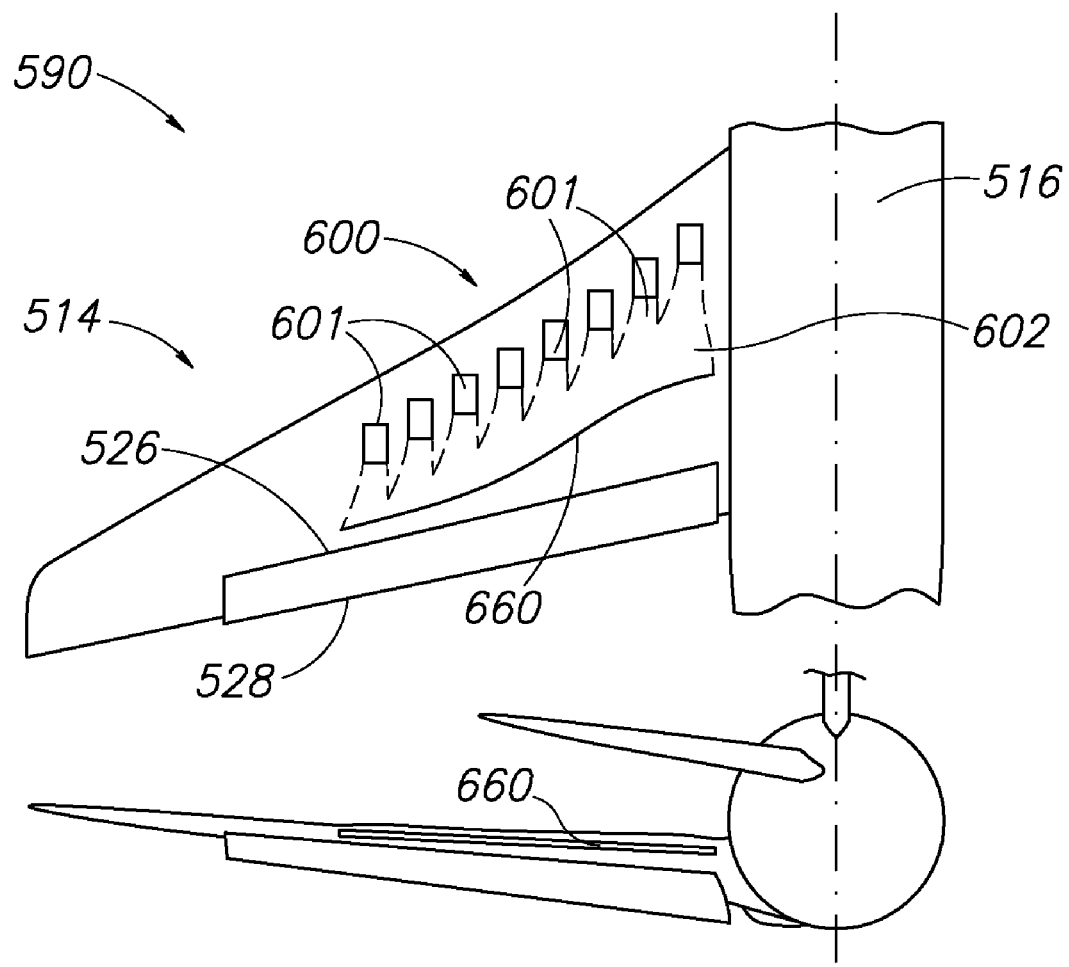
FIG. 24 are schematic plan and rear views of a curved exhaust aperture of an exhaust system in accordance with yet another embodiment of the invention.

It will be appreciated that a variety of exhaust systems in accordance with the teachings of the present disclosure may be conceived, and that the invention is not limited to the particular embodiments described above and shown in the accompanying FIGS. 1-22. For example, FIG. 23 shows rear views of several representative exhaust apertures 610-650 of exhaust systems in accordance with various alternate embodiments of the invention. Similarly, the shape of the exhaust ducts may be varied from those particular shapes shown and described above, including, for example, a curved exhaust aperture 660 of the exhaust duct as depicted in FIG. 24.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. An assembly, comprising:
   a wing assembly extending in a span-wise direction and having an upper surface and a lower surface;
   at least one propulsion unit at least partially disposed between the upper and lower surfaces, the at least one propulsion unit including at least two engines at least partially disposed between the upper and lower surfaces of the wing assembly; and
   an exhaust system configured to conduct an exhaust flow emanating from the at least two engines into a single exhaust aperture proximate a trailing edge of the wing assembly, the exhaust aperture having an aspect ratio defined as a maximum width over a maximum height, the aspect ratio being at least five.

2. The assembly of claim 1, wherein the wing assembly includes a flap member moveably coupled along a trailing edge portion of the wing assembly, the exhaust aperture being configured to direct approximately all of the exhaust flow over at least a portion of the flap member.

3. The assembly of claim 2, wherein the flap member is moveably coupled to the wing assembly along a hinge line, and wherein the exhaust aperture is integrated within at least one of the upper and lower surfaces and positioned upstream of the hinge line, and configured to direct at least part of the exhaust flow over a portion of the upper surface.

4. The assembly of claim 1, wherein each engine has an engine having an engine diameter, and wherein a ratio of the maximum width of the exhaust aperture divided by the engine diameter is at least approximately three.

5. The assembly of claim 4, wherein the two or more engines comprise at least one of a turbofan engine or a turbojet engine.

6. The assembly of claim 1, wherein each engine has a corresponding exhaust duct that extends to a duct aperture, the plurality of duct apertures collectively forming the exhaust aperture.

7. The assembly of claim 1, wherein the maximum width of the exhaust aperture is at least thirty percent of a semi-span of the wing assembly.

8. The assembly of claim 1, wherein the upper surface includes a fairing portion configured to aerodynamically integrate the exhaust aperture with the wing assembly.

9. The assembly of claim 1, wherein the maximum width of the exhaust aperture is at least eighty percent of a semi-span of the wing assembly.

10. The assembly of claim 6, wherein the exhaust duct transitions from an approximately circular cross-sectional shape proximate each engine to an approximately rectangular cross-sectional shape proximate the exhaust aperture.

11. The assembly of claim 1, wherein the at least one propulsion unit further includes:
a plurality of inlets disposed within at least one of the upper and lower surfaces, each inlet configured to receive an incoming airflow; and
a plurality of diffusers at least partially disposed between the upper and lower surfaces, each diffuser being coupled to at least one of the inlets and being configured to provide at least a portion of the incoming airflow from the at least one of the inlets to at least one of the engines; and
wherein the exhaust system includes a plurality of exhaust ducts at least partially disposed between the upper and lower surfaces, each exhaust duct being coupled to at least one of the engines and extending to a duct aperture, the plurality of duct apertures collectively forming the exhaust aperture.

12. An aircraft, comprising:
a fuselage;
at least one wing assembly extending outwardly from the fuselage in a span-wise direction, the at least one wing assembly having an upper surface and a lower surface, the at least one wing assembly including a flap member moveably coupled along a trailing edge portion of the at least one wing assembly;
at least one propulsion unit at least partially disposed between the upper and lower surfaces, the flap member extending in the span-wise direction along the wing assembly, the flap member having a length greater than the propulsion unit; and
an exhaust system configured to conduct an exhaust flow emanating from the at least one propulsion unit to an exhaust aperture proximate a trailing edge of the at least one wing assembly, the exhaust aperture having an aspect ratio defined as a maximum width over a maximum height, the aspect ratio being at least five.

13. The aircraft of claim 12, wherein the exhaust aperture is integrated within at least one of the upper and lower surfaces and configured to direct at least part of the exhaust flow over at least a portion of the flap member.

14. The aircraft of claim 12, wherein the at least one propulsion unit includes an engine having an engine diameter, and wherein a ratio of the maximum width divided by the engine diameter is at least approximately three.

15. The aircraft of claim 12, wherein the maximum width of the exhaust aperture is at least thirty percent of a semi-span of the wing assembly.

16. The aircraft of claim 12, wherein the at least one propulsion unit includes first and second propulsion units and the at least one wing assembly includes first and second wing assemblies, the first and second propulsion units being operatively coupled to a corresponding one of the first and second wing assemblies, each of the first and second propulsion units comprising:
a plurality of engines, each engine being at least partially disposed between the upper and lower surfaces of the corresponding one of the first and second wing assemblies;
a plurality of inlets disposed within at least one of the upper and lower surfaces, each inlet configured to receive an incoming airflow;
a plurality of diffusers at least partially disposed between the upper and lower surfaces, each diffuser being coupled to at least one of the inlets and being configured to provide at least a portion of the incoming airflow from the at least one of the inlets to at least one of the engines; and
a plurality of exhaust ducts at least partially disposed between the upper and lower surfaces, each exhaust duct being coupled to at least one of the engines and extending to a duct aperture, the plurality of duct apertures collectively forming the exhaust aperture.

17. A method of propelling an aircraft, comprising:
providing a wing assembly extending in a span-wise direction and having an upper surface and a lower surface;
providing at least one propulsion unit including at least two engines, the at least one propulsion unit at least partially disposed between the upper and lower surfaces;
providing at least one exhaust system coupled between the plurality of engines and an exhaust aperture, the exhaust aperture proximate a trailing edge of the wing assembly, the exhaust aperture having an aspect ratio defined as a maximum width over a maximum height, the aspect ratio being at least five;
operating the at least one propulsion unit to provide an exhaust flow; and
conducting the exhaust flow through the at least one exhaust system to the exhaust aperture.

18. The method of claim 17, wherein each of the engines have an engine diameter, and wherein providing an exhaust system includes providing an exhaust system having an exhaust aperture integrated within at least one of the upper and lower surfaces and wherein a ratio of the maximum width divided by the engine diameter is at least approximately three.

19. The method of claim 17, wherein providing an exhaust system includes providing a plurality of exhaust ducts, each engine having a corresponding exhaust duct that extends to a duct aperture, the plurality of duct apertures collectively forming the exhaust aperture.

20. The method of claim 17, wherein the maximum width of the exhaust aperture is at least thirty percent of a semi-span of the wing assembly.

* * * * *